(12) United States Patent
Matsumiya et al.

(10) Patent No.: US 8,861,322 B2
(45) Date of Patent: Oct. 14, 2014

(54) OPTICAL PICKUP AND OPTICAL READ/WRITE APPARATUS

(75) Inventors: Hiroaki Matsumiya, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 105 days.

(21) Appl. No.: 13/600,386

(22) Filed: Aug. 31, 2012

(65) Prior Publication Data

US 2012/0320727 A1 Dec. 20, 2012

(30) Foreign Application Priority Data

Oct. 7, 2011 (JP) ................................. 2011-222493

(51) Int. Cl.
| | |
|---|---|
| *G11B 7/135* | (2012.01) |
| *G11B 7/131* | (2012.01) |
| *G11B 7/14* | (2012.01) |
| *G11B 7/127* | (2012.01) |
| *G11B 7/09* | (2006.01) |
| *G11B 7/0045* | (2006.01) |
| *G11B 7/1381* | (2012.01) |
| *G11B 7/00* | (2006.01) |
| *G11B 7/003* | (2006.01) |

(52) U.S. Cl.
CPC .............. *G11B 7/0903* (2013.01); *G11B 7/131* (2013.01); *G11B 7/14* (2013.01); *G11B 7/127* (2013.01); *G11B 7/1381* (2013.01); *G11B 2007/0013* (2013.01); *G11B 7/003* (2013.01); *G11B 7/00458* (2013.01)
USPC .. 369/44.38; 369/53.28; 369/94; 369/112.05; 369/124.03

(58) Field of Classification Search
None
See application file for complete search history.

(56) References Cited

U.S. PATENT DOCUMENTS

| | | | |
|---|---|---|---|
| 4,935,913 A | 6/1990 | Shinoda | |
| 5,105,407 A | 4/1992 | Ishika | |
| 7,978,589 B1* | 7/2011 | Kivits | ...................... 369/124.03 |
| 2009/0316555 A1 | 12/2009 | Yamazaki | |

FOREIGN PATENT DOCUMENTS

| | | |
|---|---|---|
| JP | 63-249941 A | 10/1988 |
| JP | 2003-099975 A | 4/2003 |
| JP | 2008-097681 A | 4/2008 |

* cited by examiner

*Primary Examiner* — Wayne Young
*Assistant Examiner* — Brian Butcher
(74) *Attorney, Agent, or Firm* — Renner, Otto, Boisselle & Sklar, LLP

(57) ABSTRACT

An exemplary optical pickup comprises: a light source with first and second emission points; an optical branching element which branches light emitted from the first emission point into multiple light beams including a first main beam and first sub-beams and which also branches light emitted from the second emission point into multiple light beams including a second main beam and second sub-beams; an optical system which condenses the multiple light beams produced by the optical branching element onto an optical storage medium, thereby making the first and second main beams form a write light beam spot and a read light beam spot, respectively, on a target recording track on the storage medium and making the first and second sub-beams form reference light beam spots and other light beam spots somewhere on the storage medium other than the target recording track.

20 Claims, 26 Drawing Sheets

⊗ TRACKING DIRECTION

⊗ TRACKING DIRECTION

⊗ TRACKING DIRECTION

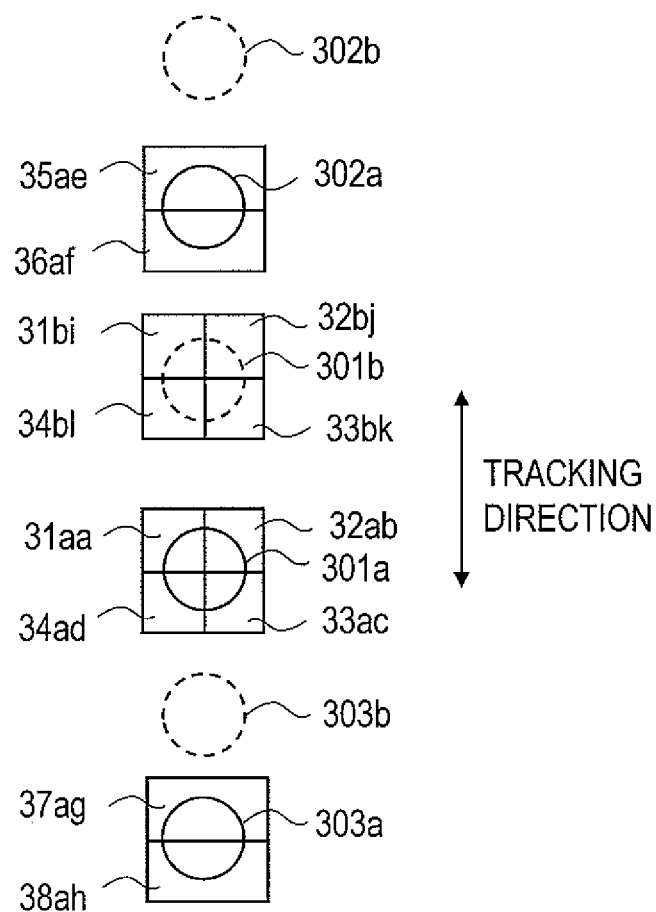

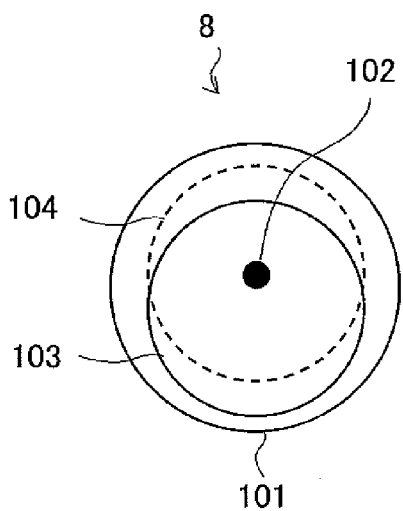
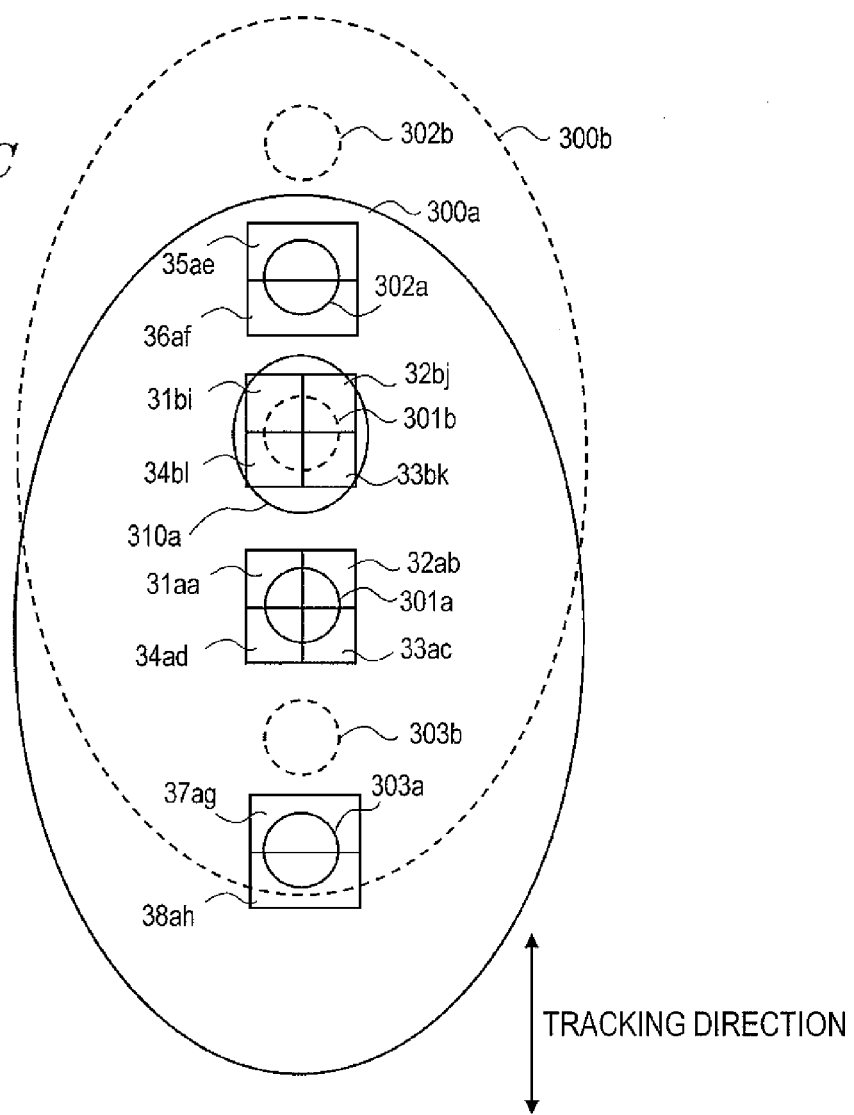

TRACKING DIRECTION

OPTICAL MODULATOR

TRACKING DIRECTION

TRACKING DIRECTION

⊗ TRACKING DIRECTION

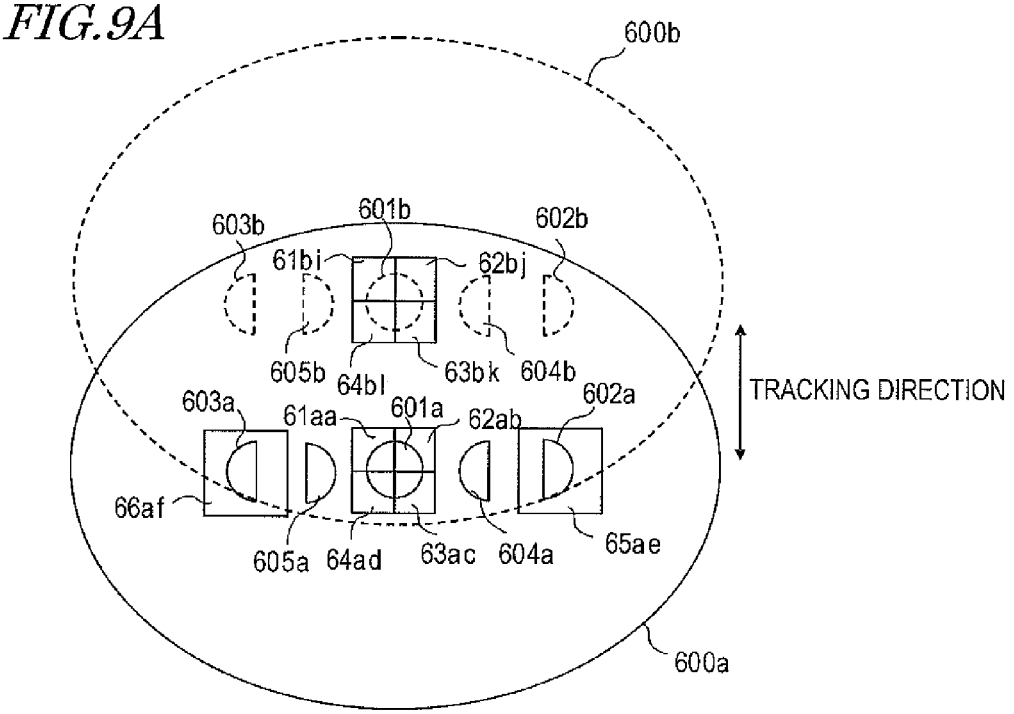
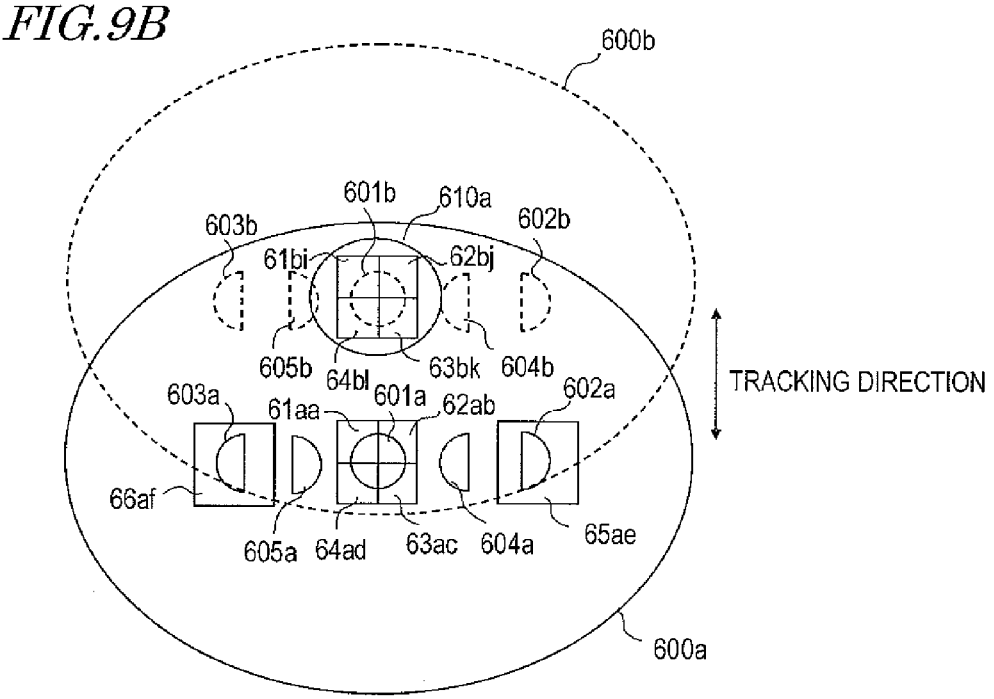

TRACKING
DIRECTION

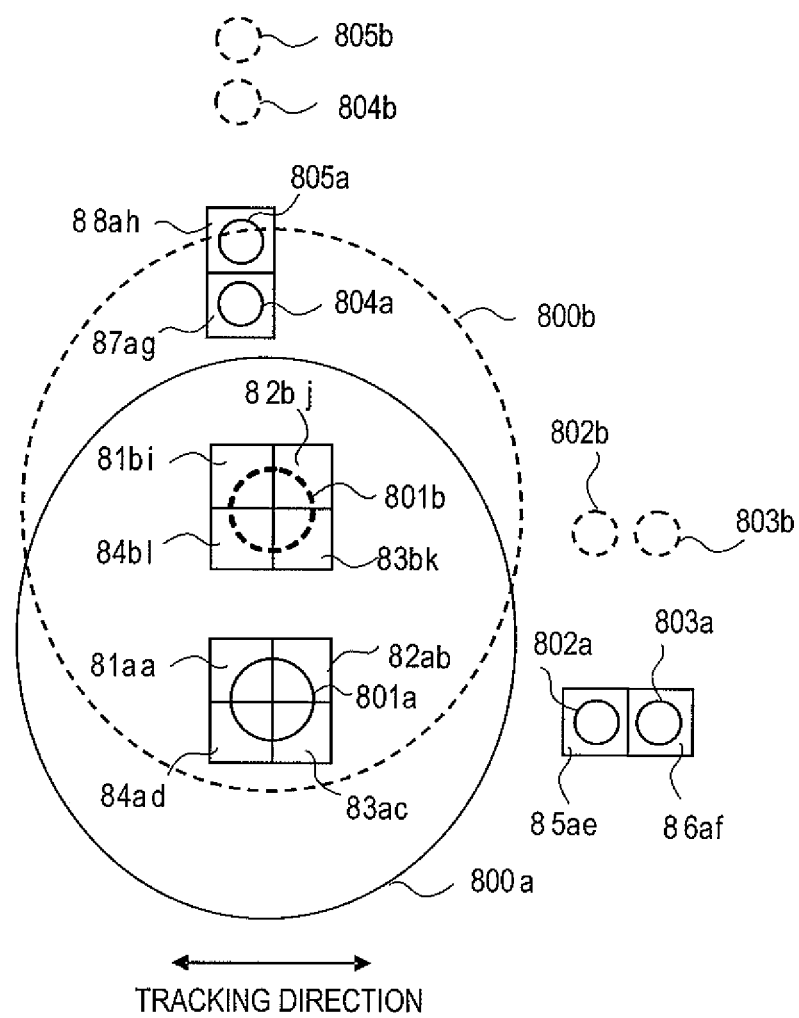

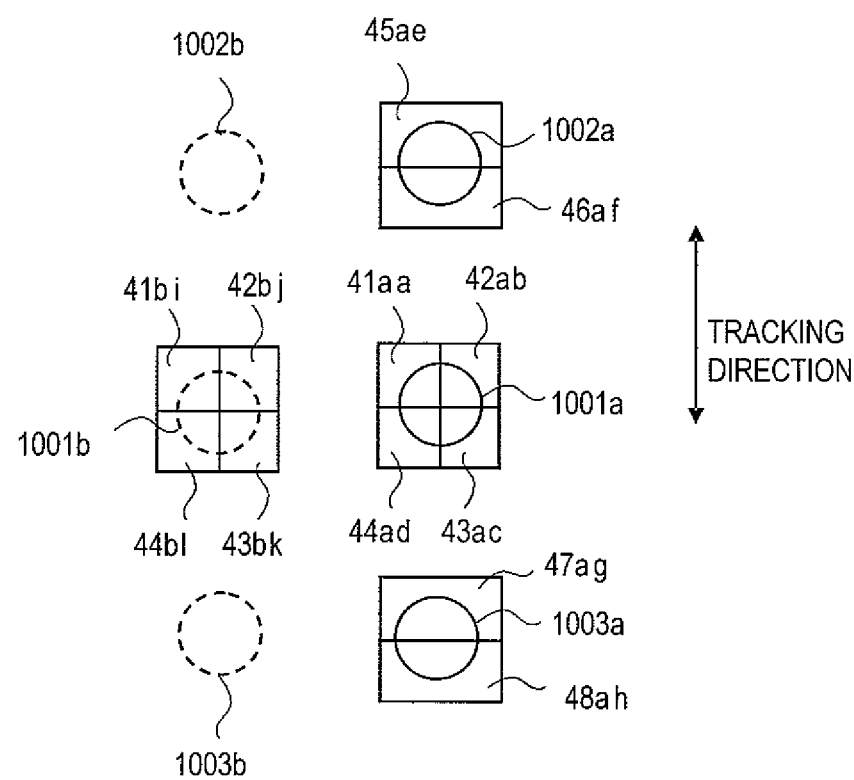

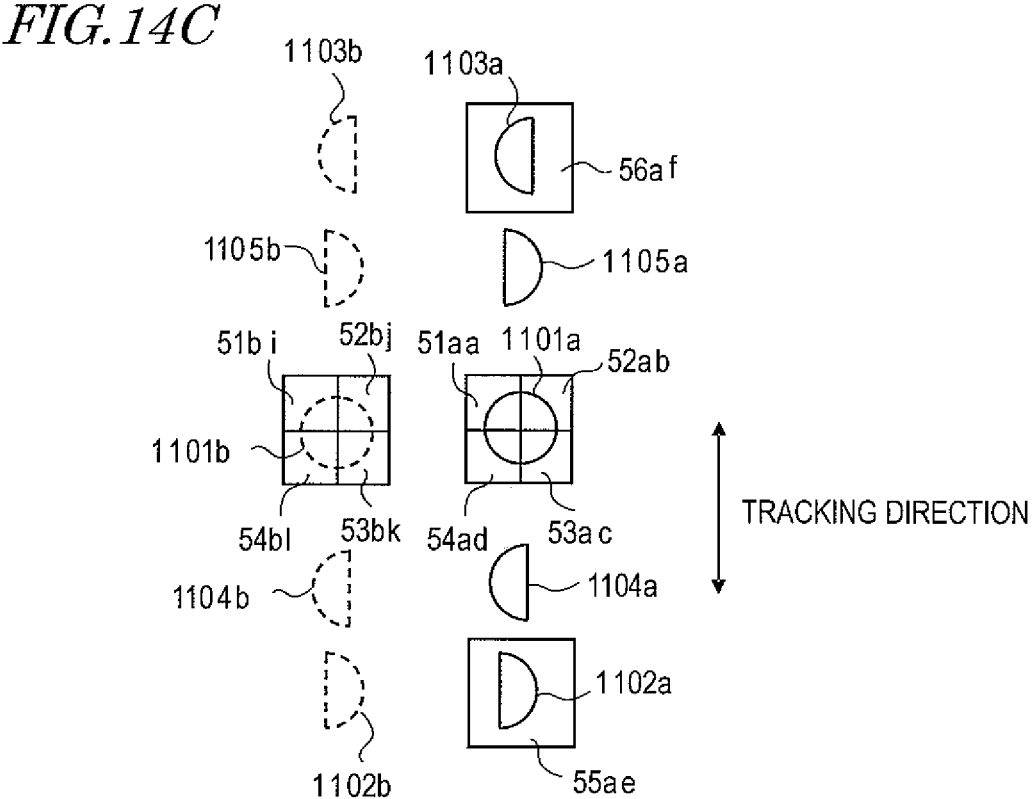

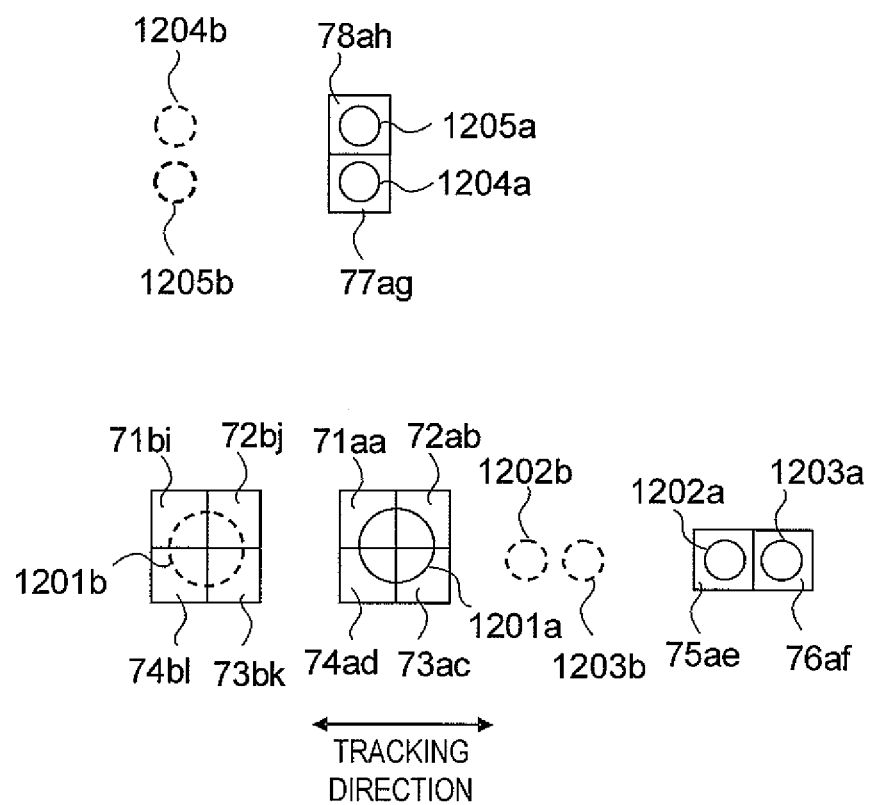

OPTICAL PICKUP AND OPTICAL READ/WRITE APPARATUS

BACKGROUND

1. Technical Field

The present application relates to an optical read/write apparatus that reads and writes information from/on an optical storage medium such as an optical tape, an optical disc or an optical card.

2. Description of the Related Art

Recently, the size of digital data that can be stored on a storage medium has been rising steeply year by year as the resolutions of video data and still picture data have been tremendously increased and as increasing numbers of paper media have been converted into electronic ones.

Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible.

As there is an increasing demand for saving such a huge amount of data with as much reliability as possible, people are lately considering using an optical pickup that forms a plurality of light beam spots on a single optical storage medium for an optical read/write apparatus, too. In that case, using those two light beam spots, two different sets of data can be read or written in parallel with each other or data can be written somewhere while another data is being read elsewhere. As a result, data can be read or written at an increased transfer rate or data being written can be read and verified simultaneously.

A known optical read/write apparatus that forms multiple light beam spots on an optical storage medium is disclosed in Japanese Laid-Open Patent Publication No. 63-249941.

FIG. 16A illustrates a simplified one of the optical pickup arrangement disclosed in Japanese Laid-Open Patent Publication No. 63-249941. The optical pickup is configured to perform read/write operations in parallel with each other using three light beam spots. Hereinafter, it will be described briefly how such an optical pickup works.

As shown in FIG. 16A, the optical system of the optical pickup includes a laser light source 1301, a diffractive element 1302, a beam splitter 1303, a collimator lens 1304, a wave plate 1305, an objective lens 1306, a condenser lens 1308 and a photodetector 1309. The light emitted from the laser light source 1301 gets diffracted by the diffractive element 1302 and split mainly into a zero-order light beam and ±first-order light beams, which are then condensed by the objective lens 1306, thereby forming three light beam spots (that are a main light beam spot 1311 and two sub-light beam spots 1312 and 1313) on the same track on the optical storage medium 1307.

FIG. 16B illustrates the arrangement of light beam spots that are formed on the surface of the optical storage medium 1307.

In the example illustrated in FIG. 16B, the main light beam spot 1311 formed by the zero-order light beam is a write beam spot, which is used to write a signal on the storage medium 1307. On the other hand, the two sub-light beam spots 1312 and 1313 formed by the ±first-order light beams are read beam spots, which are used to read a recorded track. Due to the efficiency ratio of the diffractive element, the intensities of the ±first-order light beams are much lower than that of the zero-order light beam.

The main light beam spot 1311 and the sub-light beam spots 1312 and 1313 are located on the same track. And these spots move on the storage medium in the direction indicated by the arrow 1314. Of these two sub-light beam spots, the sub-spot 1312 moves behind the main light beam spot 1311 for writing and reads the recorded mark. Meanwhile, the other sub-light beam spot 1313 moves ahead of the main light beam spot 1311 for writing, and its reflected light includes no information about the recorded mark. In FIG. 16B, the information storage layer of the optical storage medium 1307 has an uneven surface. The light beam spots move along a recording track 21 (i.e., a land portion, which may be a raised portion of the uneven surface) on which a mark will be recorded in the direction indicated by the arrow 1314. Actually, however, the light beam spots are fixed and the optical storage medium runs in the direction opposite to the one indicated by the arrow 1314. These light beams are reflected from the optical storage medium 1307, transmitted through the optical system, and then incident on the photodetector 1309, which detects their quantities of light.

FIG. 16C illustrates the arrangement of photodiodes in the photodetector 1309.

The quadruple photodiodes 1401 shown in FIG. 16C receive the zero-order light beam (i.e., the reflected light that has left the main light beam spot 1311 forms a detected light beam spot 1404 for writing). The magnitude of astigmatism produced by the condenser lens 1308 shown in FIG. 16A changes with the degree of defocusing, thereby detecting a focus signal. The photodiodes 1401 also detect a tracking error signal by the push-pull method.

On the other hand, the photodiodes 1402 and 1403 receive reflected light beams that have left the sub-light beam spots 1312 and 1313, respectively.

The laser light source 1301 emits a light beam that has been modulated by an optical modulator 1310 with a modulation signal in order to record a mark on the optical storage medium 1307.

Naturally, the read beams that have been emitted from the same laser light source and have left the sub-light beam spots 1312 and 1313 have also gone through that modulation. That is why the reflected light that has left the sub-light beam spot 1312 and that moves behind the main light beam spot for writing in the two read sub-light beam spots of the ±first-order light has a signal component, to which a variation in reflectance caused by a recorded mark and a variation in the quantity of light due to the modulation of light have been added. Meanwhile, the other sub-light beam spot 1313 moves ahead of the main light beam spot for writing through an unrecorded portion, and therefore, its reflected light has not been affected by the variation in reflectance caused by the recorded mark. Consequently, only a signal representing a variation in the quantity of light due to the modulation of the light by the light source is obtained from the reflected light that has left the sub-light beam spot that moves ahead of the main light beam spot.

For that reason, by performing a differential arithmetic operation on the two signals representing those two sub-light beam spots detected, a read signal (i.e., a monitor signal for verification purposes) can be obtained.

Thus, by forming the light beam spot for writing and the light beam spots for reading at the same time and by performing a verify operation by reading a signal that has just been written while performing a write operation, a system that achieves even higher write and transfer rate and ensures a good deal of reliability is realized.

SUMMARY

An optical pickup according to one aspect of the present disclosure includes: a light source with first and second emission points; an optical branching element which branches light that has been emitted from the first emission point into multiple light beams including a first main beam and a first set of sub-beams and which also branches light that has been emitted from the second emission point into multiple light beams including a second main beam and a second set of sub-beams; an optical system which condenses the multiple light beams that have been produced by the optical branching element onto an optical storage medium, thereby making the first and second main beams form a write light beam spot and a read light beam spot, respectively, on a target recording track on the optical storage medium and making the first and second sets of sub-beams form reference light beam spots and other light beam spots somewhere on the optical storage medium other than the target recording track; and a photodetector. The photodetector includes a plurality of photosensitive sections forming a first group which receive reflected light beams that have left the write light beam spot and the reference light beam spots, and a photosensitive section forming a second group which receives reflected light that has left the read light beam spot. The photosensitive sections forming the first and second groups are arranged so as not to receive reflected light beams of the second set of sub-beams that have left the other light beam spots.

An optical pickup according to another aspect of the present disclosure includes: a light source with first and second emission points; an optical system which condenses light beams that have been emitted from the first and second emission points onto an optical storage medium, thereby forming a write light beam spot and a read light beam spot on a target recording track on the optical storage medium; an optical branching element which branches reflected light that has left the write light beam spot into multiple light beams including a first main beam and a first set of sub-beams and which also branches reflected light that has left the read light beam spot into multiple light beams including a second main beam and a second set of sub-beams; and a photodetector. The photodetector includes a first group of photosensitive sections which receive the first main beam and the first set of sub-beams, and a second group of photosensitive sections which receive the second main beam. The photosensitive sections forming the first and second groups are arranged so as not to receive the second set of sub-beams.

An optical pickup according to still another aspect of the present disclosure includes: a light source; a first optical branching element which branches light that has been emitted from the light source into multiple light beams; an optical system which condenses the multiple light beams that have been produced by the first optical branching element onto an optical storage medium, thereby forming a write light beam spot and a read light beam spot on a target recording track on the optical storage medium; a second optical branching element which branches reflected light that has left the write light beam spot into multiple light beams including a first main beam and a first set of sub-beams and which also branches reflected light that has left the read light beam spot into multiple light beams including a second main beam and a second set of sub-beams; and a photodetector. The photodetector includes: a first group of photosensitive sections which receive the first main beam and the first set of sub-beams; and a second group of photosensitive sections which receive the second main beam. The first and second groups of photosensitive sections are arranged so as not to receive the second set of sub-beams.

An optical read/write apparatus according to the present disclosure includes: at least one optical pickup according to any of the embodiments of the present disclosure described above; and a control section that controls the optical pickup so that the optical pickup writes data using the write light beam spot and reads the data using the read light beam spots.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 5B illustrates an arrangement for a photodetector according to the first embodiment of the present disclosure.

FIG. 6B illustrates the condenser lens 8 as viewed from the polarization beam splitter 3.

FIG. 6C illustrates stray light rays to enter the photodetector of the first embodiment of the present disclosure.

FIG. 9A illustrates stray light rays to enter the photodetector of the second embodiment of the present disclosure.

FIG. 9B illustrates stray light rays to enter the photodetector of the second embodiment of the present disclosure.

FIG. 11B illustrates stray light rays to enter the photodetector of the third embodiment.

FIG. 12C illustrates an arrangement for photodetector according to the fourth embodiment of the present disclosure.

FIG. 14C illustrates an arrangement for a photodetector according to the fifth embodiment.

FIG. 15C illustrates an arrangement for a photodetector according to the sixth embodiment.

DETAILED DESCRIPTION

In the known arrangement described above, the following respects need to be taken into account.

Figure 16A:
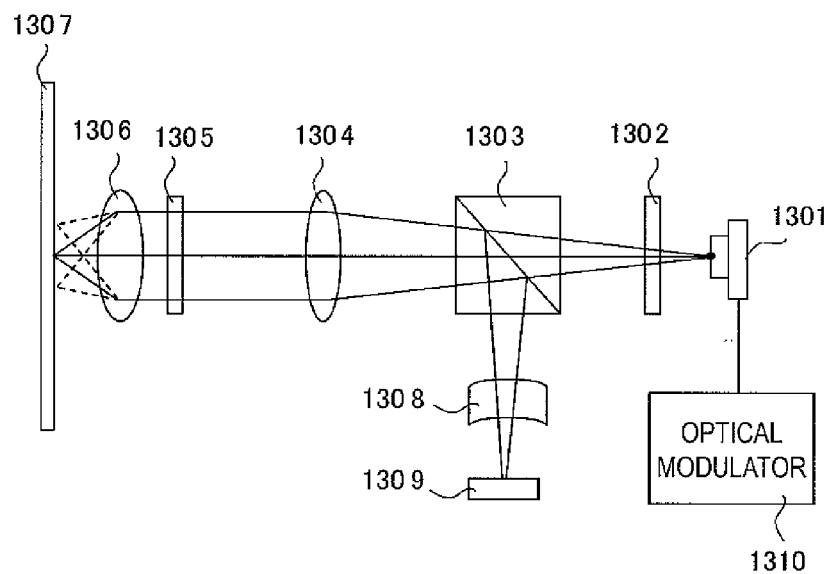
FIG. 16A illustrates an arrangement for an optical pickup for use in a known optical read/write apparatus.
Figure 16B:
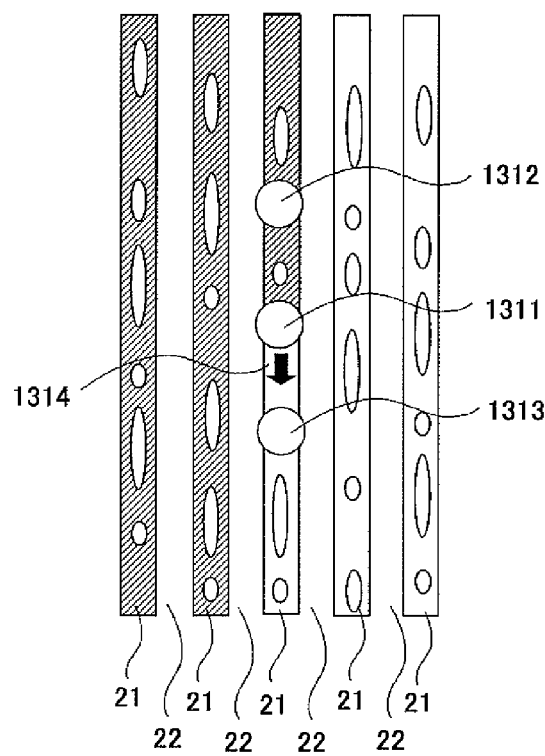
FIG. 16B illustrates how spots are left on an optical storage medium by the known optical read/write apparatus.
Figure 16C:
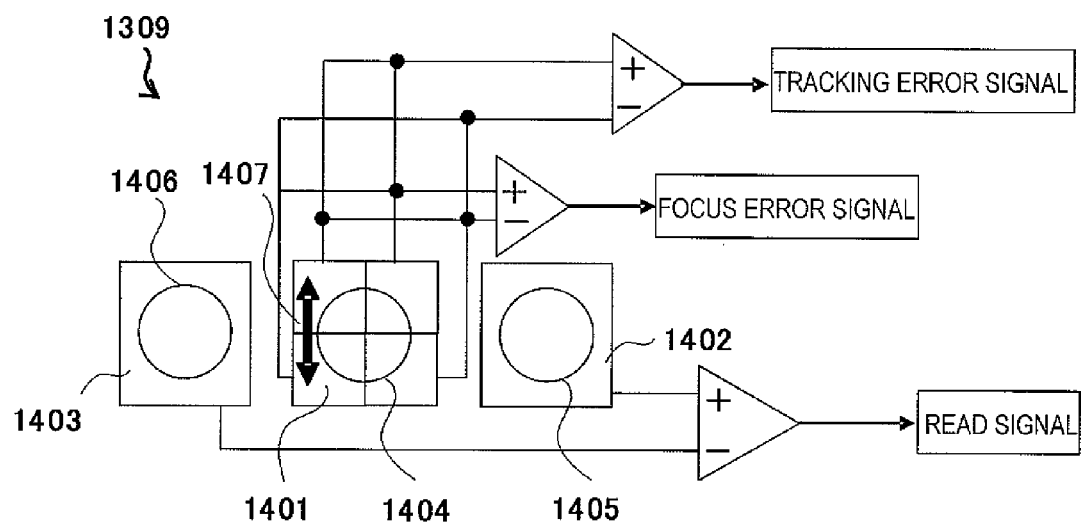
FIG. 16C illustrates a configuration for a signal detector in a known optical read/write apparatus.
Figure 16D:
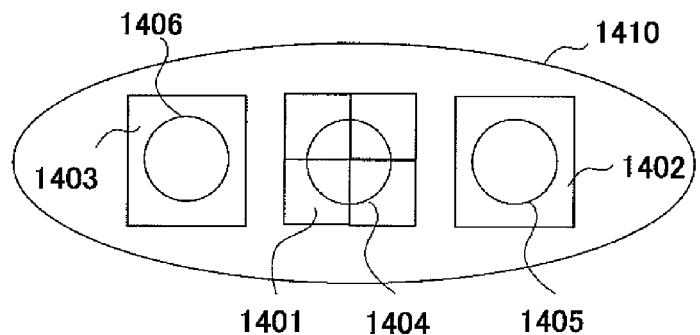
FIG. 16D illustrates a configuration for a signal detector in a known optical read/write apparatus.

As shown in FIG. 16C, in the known arrangement, a tracking error signal is generated by getting the reflected light that has left the main light beam spot received at the quadruple photodiodes 1401 and by obtaining a vertical differential signal by the push-pull method. According to such a detecting method, however, when the objective lens 1306 moves in the tracking direction (i.e., "track crossing direction" that is perpendicular to the direction in which the tracks run) to perform a tracking operation, an offset will be produced in the tracking error signal, which is a serious problem. The objective lens 1306 is driven by a lens actuator in the optical pickup. When the optical storage medium 1307 rotates or runs, the tracks of the optical storage medium 1307 will slightly move horizontally with respect to the optical pickup. The tracking control is carried out so that the objective lens 106 can always follow the centerline of the tracks even in such a situation. Such a shift of the position of the objective lens 1306 in the tracking direction with respect to the optical pickup is called a "lens shift". The magnitude of the lens shift may be defined as the magnitude of the shift of the center of the lens in the tracking direction with respect to the center position of the objective lens 1306 when the tracking control is not performed. When the lens shift occurs, the main light beam spot 1404 detected by the photodetector 1309 shown in FIG. 16C displaces vertically, i.e., in any of the directions indicated by the arrow 1407 in FIG. 16C. As a result, the tracking error signal that has been obtained based on the differential signal, which has been calculated vertically on the photodetector 1309, by the push-pull method will produce an offset, and the main light beam spot will have an offset with respect to the center of the track.

In the known arrangement described above, of those multiple light beam spots, the main light beam spot 1311 is used to perform a write operation and the sub-light beam spots 1312 and 1313 are used to perform a read operation. Even if each of these light beam spots is used to perform a read or write operation, the same problem will also arise.

According to embodiments of the present disclosure, even if a lens shift occurs while read/write operations are being performed in parallel using multiple light beam spots, the tracking error signal will still produce no offset and the read/write operations can also get done with good stability.

Embodiment 1

Hereinafter, embodiments of an optical read/write apparatus according to the present disclosure will be described. An optical read/write apparatus as an embodiment of the present disclosure is an optical data streamer apparatus that uses an optical tape as an optical storage medium. Such an optical data streamer apparatus may be used to back up a huge quantity of data. In order to back up such an enormous quantity of data in a short time with the transfer rate increased, the optical data streamer apparatus includes a lot of optical pickups. It should be noted that the optical read/write apparatus of the present disclosure does not have to be an optical data streamer apparatus but may also be an optical disc apparatus or any other kind of apparatus. In the case of an optical disc apparatus, the optical storage medium is not an optical tape but an optical disc.

Figure 1A:
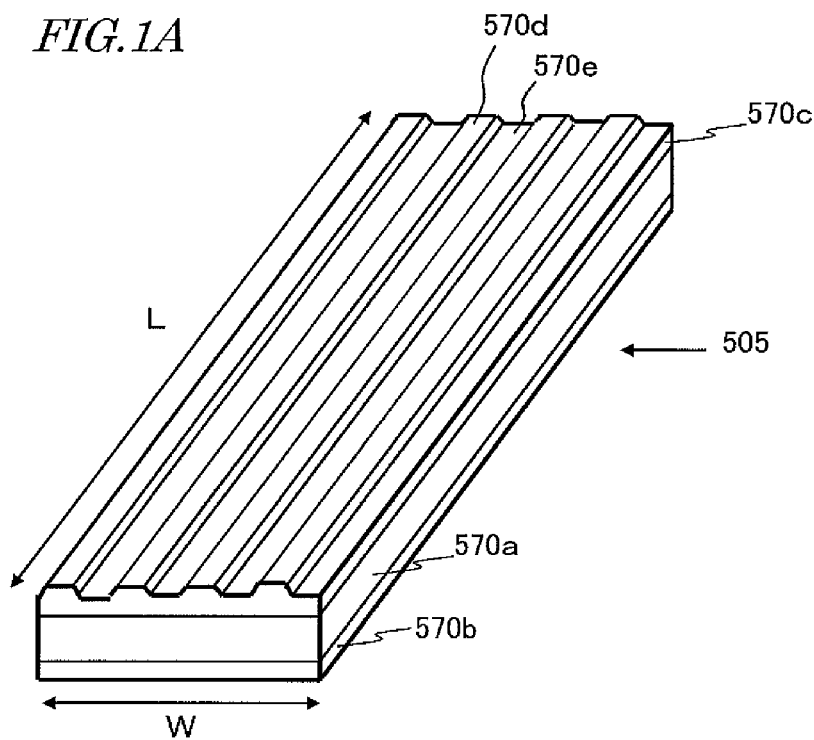
FIG. 1A is a perspective view schematically illustrating a portion of an optical tape 550 on a larger scale.

FIG. 1A is a perspective view schematically illustrating a portion of an optical tape 505 on a larger scale. The optical tape 505 may include a base film 570a, a back coating layer 570b that is adhered to the back surface of the base film 570a, and an imprint layer 570c that is supported by the base film 570a. On the upper surface of the imprint layer 570c, lands 570d and grooves 570e have been formed. Although not shown in FIG. 1A, a reflective film and a recording material film are deposited over the entire upper surface of the imprint layer 570c. The optical tape 505 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 1A illustrating the optical tape 505 is not to scale. Actually, the optical tape 505 may have several hundreds, or an even greater number, of lands 570d and grooves 570e. In one embodiment, data is written on either the lands 570d or the grooves 570e. The lands 570d or the grooves 570e on which data is written will be referred to herein as "tracks", which may have a pitch of 0.2 μm to 0.4 μm, for example.

Figure 1B:
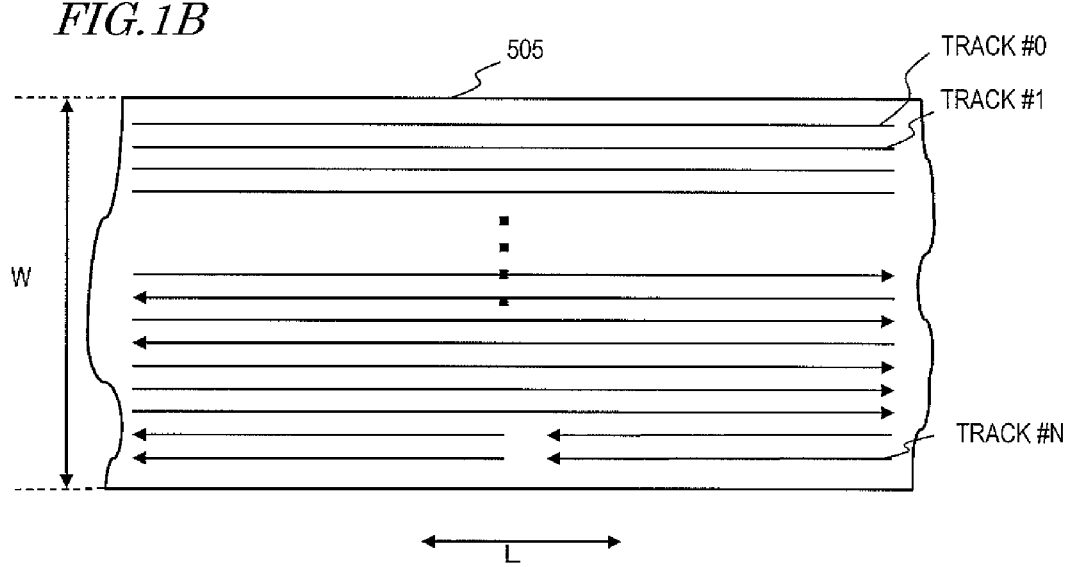
FIG. 1B is a plan view schematically illustrating a portion of the optical tape 150.

FIG. 1B is a plan view schematically illustrating a portion of the optical tape 505. As shown in FIG. 1B, N (which is an integer that is typically equal to or greater than 100) tracks #0 through #N have been formed to run in the longitudinal direction L. Some of those tracks illustrated in FIG. 1B are illustrated with an arrow. Each of those arrows indicates the direction in which data is written. That is to say, data can be written in multiple different directions on a single optical tape 505.

On the optical tape 505, a mark can be recorded optically by irradiating the tape 505 with a light beam. More specifically, such a mark is recorded on its recording material film. The light beam is radiated by an "optical pickup" that includes a light source and an objective lens that focuses the light beam emitted from the light source on the optical tape 505. When the optical pickup irradiates the optical tape 505 with a light beam, the irradiated portion of the optical tape 505 comes to have a different optical property such as a reflectance from the rest (i.e., the non-irradiated portion) of the optical tape 505. Such a portion, of which the optical property has changed in this manner, is called a "recorded mark".

In optical tape technologies, data can be read out from the optical tape 505 by irradiating the tape 505 with a relatively weak light beam with a constant intensity and detecting the light that has been modulated by, and reflected from, the optical tape 505. In writing data on the optical tape 505, data is written there by irradiating the optical tape 505 with a pulsed light beam, of which the optical power has been changed according to the data to be written, and locally changing the property of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 505, the light beam always needs to maintain a predetermined converging state on a target track. For that purpose, a "focus control" and a "tracking control" need to be done. The "focus control" means controlling the position of an objective lens along a normal to the surface (i.e., information storage layer) of the optical tape 505 so that the focal point (or at least the converging point) of the light beam is always located on the target track. On the other hand, the "tracking control" means controlling the position of the objective lens parallel to the information storage layer of the optical tape 505 and perpendicularly to the track so that the light beam spot is always located right on the target track.

In order to perform such a focus control or a tracking control, the focus error or the tracking error needs to be detected based on the light that has been reflected from the optical tape 505 and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 505.

Figure 2A:
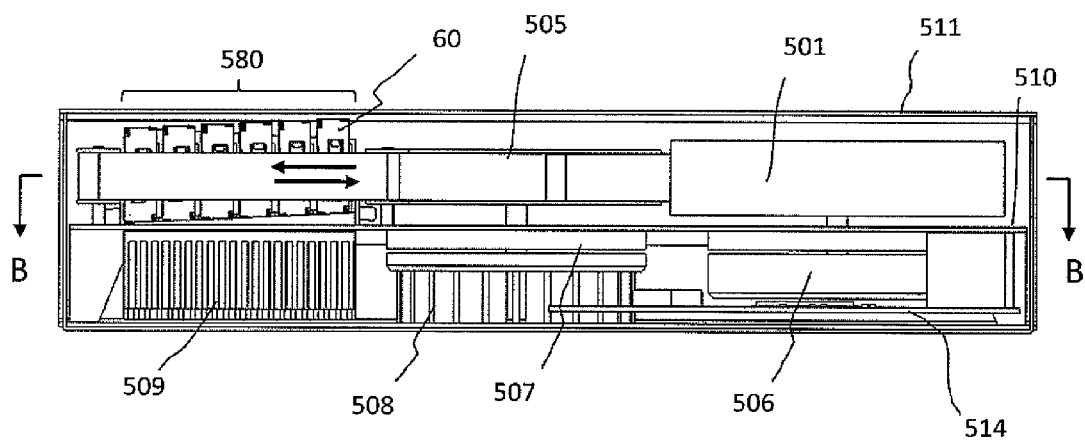
FIG. 2A illustrates an exemplary arrangement for an optical data streamer apparatus as a first embodiment of the present disclosure.
Figure 2B:
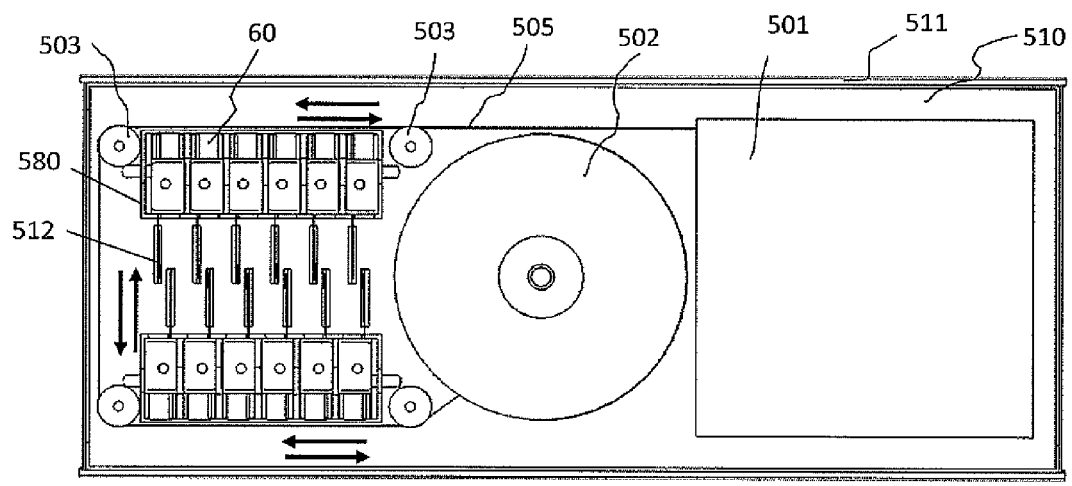
FIG. 2B is a cross-sectional view of the apparatus as viewed on the plane B-B shown in FIG. 2A.

FIG. 2A illustrates an exemplary arrangement for an optical data streamer apparatus as an embodiment of the present disclosure, and FIG. 2B is a cross-sectional view of the apparatus as viewed on the plane B-B shown in FIG. 2A. In the embodiment illustrated in FIG. 2A, the upside corresponds to perpendicularly upside, and the downside corresponds to perpendicularly downside. Thus, FIG. 2B illustrates an exemplary internal arrangement of this optical data streamer apparatus as viewed from right over the apparatus.

FIGS. 2A and 2B illustrate a situation where the apparatus is loaded with a tape cartridge 501 in which the optical tape 505 is housed. The tape cartridge 501 is readily attachable and removable to/from the apparatus. And the optical data streamer apparatus shown in FIGS. 2A and 2B is loaded with a selected one of multiple tape cartridges 501 that have the same shape.

The optical data streamer apparatus of this embodiment includes a housing 111, a chassis 150 that is arranged inside of the housing 111, a plurality of pickup parts 60 that are arranged so as to write data on the optical tape 505, and a radiator 509. Those pickup parts 60 are positioned by a positioning mechanism provided for an optical pickup assembly 580.

More specifically, this optical data streamer apparatus includes motors 506 and 507 that make the optical tape 505 run, guide posts 503 and a winding spool 502. The motor 507 is mechanically interlocked with the winding spool 502 and turns the winding spool 502. On the other hand, the motor 506 is mechanically interlocked with the shaft of the tape cartridge 501 loaded and operates so as to wind the tape 505, which has been pulled out of the tape cartridge 501, back to the tape cartridge 501. Using these two motors 506 and 507, the tape 505 can run in both of the two directions that are indicated by the arrows.

The optical pickup assembly 580 includes a number of pickup parts 60, which are arranged in the direction in which the optical tape 505 runs. The optical pickup assembly 580 of this embodiment has upper and lower arrays of pickup parts 60. In the housing 111, arranged is a blower fan 508 that is mechanically coupled to the motor 507. That is why as the motor 507 turns, the blower fan 508 turns, too.

Each pickup part 60 has a single or multiple optical pickups. The configuration of each optical pickup will be described in detail later. The pickup parts 60 are connected to flexible printed circuit boards (FPCs) 112 for optical pickups. This optical data streamer apparatus further includes a circuit board (not shown) that is connected to the flexible printed circuit boards 112 and that includes circuit components that control the pickup parts 60 and the motors 506 and 507. Optionally, the pickup parts 60 and a circuit that would normally be mounted on another circuit board could be partially arranged on the flexible printed circuit boards 112.

Hereinafter, an exemplary circuit configuration for an optical data streamer apparatus according to this embodiment will be described with reference to FIG. 3.

Figure 3:
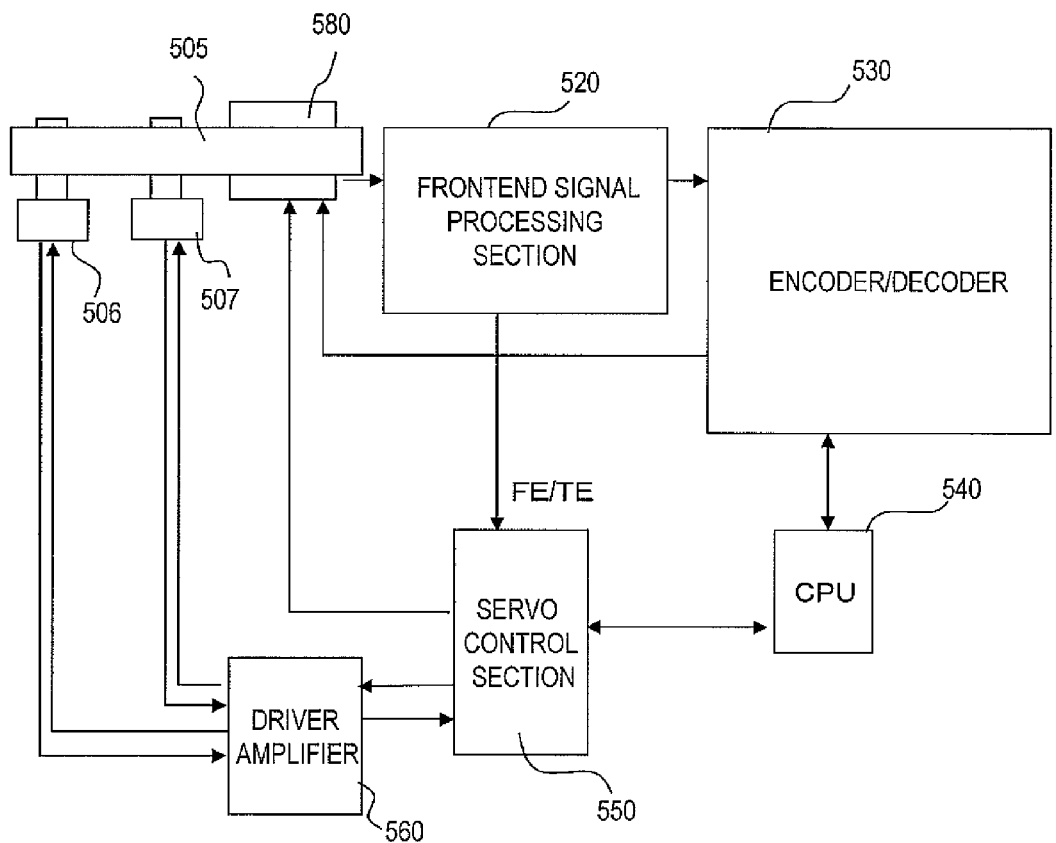
FIG. 3 illustrates an exemplary circuit configuration for an optical data streamer apparatus according to the first embodiment.

The optical data streamer apparatus illustrated in FIG. 3 includes circuit blocks that are electrically connected to the optical pickup assembly 580 and motors 506 and 507.

In the exemplary configuration shown in FIG. 3, the output of the optical pickup assembly 580 is supplied to an encoder/ decoder 530 by way of a frontend signal processing section 520. In reading data, the encoder/decoder 530 decodes the data that is stored on the optical tape 505 based on the signal that has been generated by the optical pickup assembly 580. In writing data, on the other hand, the encoder/decoder 530 encodes the data to generate a signal to be written on the optical tape 505 and outputs the signal to the optical pickup assembly 580.

The frontend signal processing section 520 generates a read signal based on the output of the optical pickup assembly 580, and also generates a focus error signal FE and a tracking error signal TE. The focus error signal FE and the tracking error signal TE are then supplied to a servo control section 550. In response, the servo control section 550 gets the motors 506 and 507 controlled by a driver amplifier 560. The servo control section 550 also gets the position of an objective lens controlled by a lens actuator in the optical pickup assembly 580. The encoder/decoder 530, the servo control section 550 and all the other components are controlled by a CPU 540. The blocks illustrated in FIG. 3 can be implemented by assembling together integrated circuit elements, memories and other electronic parts on a circuit board.

The information storage layer of the optical tape 505 that can be used in this embodiment may have a width of about 10 mm, for example. In that case, data can be read and written from/on the running optical tape 505 over the entire width of the information storage layer thereof by twenty-four optical pickups, for example.

Before the tape cartridge 501 is loaded into this optical data streamer apparatus, the optical tape 505 housed in the tape cartridge 501 has been wound around a spool (not shown). And when the tape cartridge 501 is loaded into the optical data streamer apparatus, the optical tape 505 is pulled out while being guided by a number of tape guide posts 503 and then wound around the winding spool 502. Each of the pickup parts 60 is fixed at a predetermined position with respect to the optical tape 505 so as to read and write information from/on the optical tape 505. In this embodiment, twenty-four optical pickups are provided, and therefore, data can be read and written simultaneously by using a maximum of twenty-four optical pickups. It should be noted that the number of optical pickups provided for a single optical data streamer apparatus does not have to be, and may be greater or smaller than, twenty-four.

The feed motor 507 drives and turns the winding spool 502, thereby running the optical tape 505 in the forward direction. At the same time, the feed motor 507 also drives the blower fan 508. On the other hand, the reverse motor 506 drives and turns a spool (not shown) in the tape cartridge 501, thereby running the optical tape 505 in the reverse direction. In the meantime, as the winding spool 502 is also driven by the optical tape 505, the blower fan 508 is turned, too. As the pickup parts 60 are thermally coupled to the radiator 509, the heat generated by the pickup parts 60 is transferred to the radiator 509.

During reading or writing, the optical tape 505 is run either in the forward direction by the feed motor 507 or in the reverse direction by the reverse motor 506, while those optical pickups can perform a read/write operation on the optical tape 505 at the same time.

Hereinafter, embodiments of an optical pickup that can be used in the optical read/write apparatus will be described in detail with reference to the accompanying drawings.

The optical pickup of this embodiment can be used to generate a tracking signal by the DPP method.

Figure 4A:
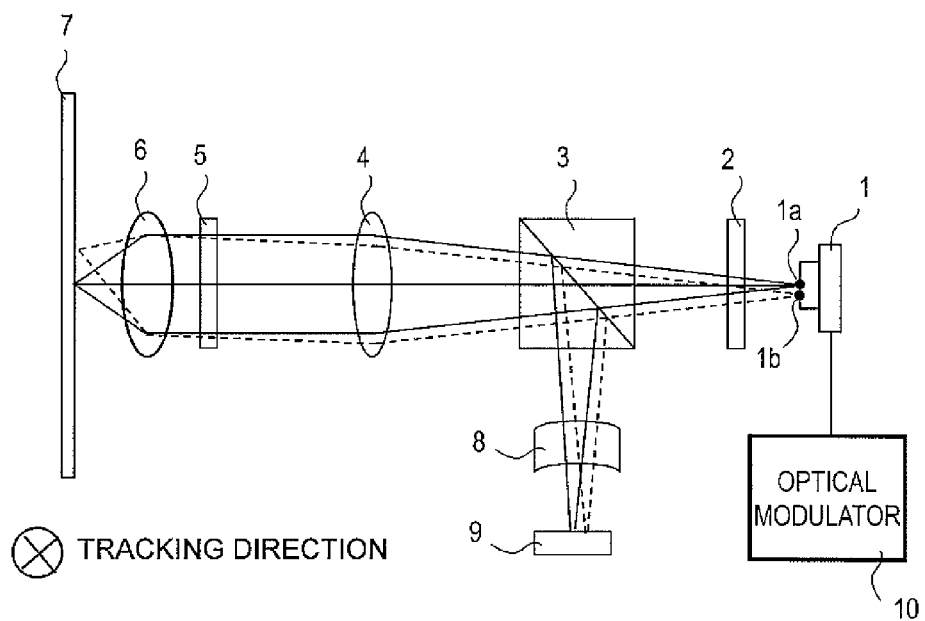
FIG. 4A illustrates an arrangement for an optical pickup according to the first embodiment.

FIG. 4A illustrates the arrangement of an optical system for an optical pickup according to this embodiment. This optical pickup may be used in not only the optical data streamer apparatus described above but also any other optical read/write apparatus as well. Particularly, this optical pickup can be used to write data on an optical storage medium in which multiple information storage layers are stacked one upon the other. For that reason, in the following description, this embodiment will be described more generally as being applied to an "optical storage medium 7" including a multi-layer optical disc, instead of the optical tape 505.

An optical pickup according to this embodiment includes a laser light source 1 with first and second emission points 1a and 1b, an optical modulator 10 which records a signal mark (i.e., forms a recorded mark) on the optical storage medium 7, a diffractive element 2 which diffracts the light that has come from the laser light source 1 and which branches it into a zero-order light beam and ±first-order light beams, an objective lens 6 which condenses the diffracted light onto the optical storage medium 7, and a photodetector 9 which receives the light that has been reflected from the optical storage medium 7. With this optical pickup, while data is being written on the optical storage medium 7 with the light that has been emitted from the emission point 1a, a read signal can be obtained from the optical storage medium 7 with the light that has been emitted from the emission point 1b. Part or all of the optical modulator 10 may be arranged outside of the optical pickup.

In this embodiment, the diffractive element 2 functions as an optical branching element, which branches the light that has been emitted from the first emission point 1a into a plurality of light beams including a first main beam (i.e., zero-order light beam) and a first set of sub-beams (i.e., ±first-order light beams) and which also branches the light that has been emitted from the second emission point 1b into a plurality of light beams including a second main beam (i.e., zero-order light beam) and a second set of sub-beams (i.e., ±first-order light beams).

According to this embodiment, an optical system including the optical elements to be described later and the objective lens 6 works to condense a plurality of light beams, which has been produced by the diffractive element 2, onto the optical storage medium 7. By using this optical system, a write light beam spot and a read light beam spot can be formed on a target recording track of the optical storage medium 7 by the first main beam (i.e., the zero-order light beam produced by the light that has come from the emission point 1a) and the second main beam (i.e., the zero-order light beam produced by the light that has come from the emission point 1b), respectively. Also, by using this optical system, a plurality of reference light beam spots and other light beam spots can be formed somewhere on the optical storage medium 7 other than the target recording track by the first set of sub-beams (i.e., the ±first-order light beams produced by the light that has come from the emission point 1a) and the second set of sub-beams (i.e., the ±first-order light beams produced by the light that has come from the emission point 1b), respectively.

Figure 4B:
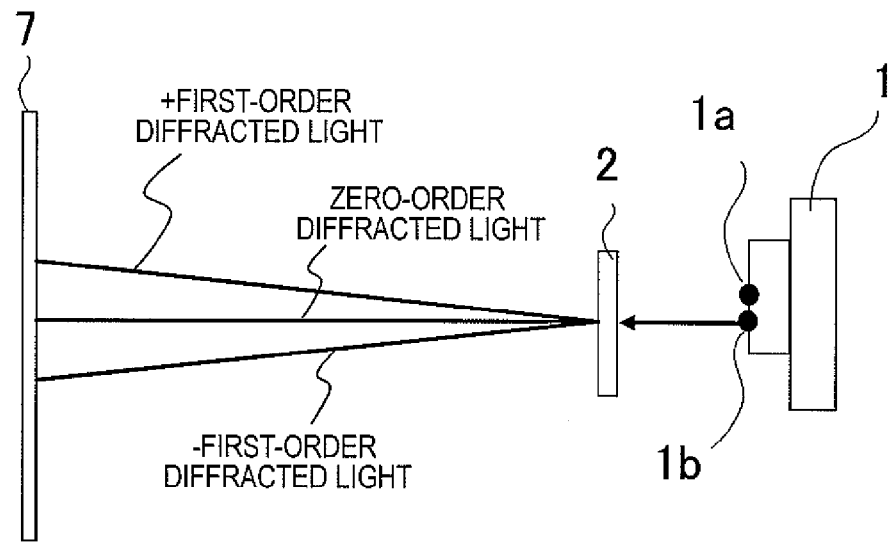
FIG. 4B illustrates how the diffractive element 2 works.

FIG. 4B illustrates how the diffractive element 2 works. In FIG. 4B, illustrated is how the light that has been emitted from a single emission point gets branched by the diffractive element 2 into a zero-order light beam and ±first-order light beams for the sake of simplicity. The higher the order of a diffracted light beam produced by the diffractive element 2, the lower the diffraction efficiency gets. For that reason, illustration of other higher-order light beams is omitted.

Figure 4C:
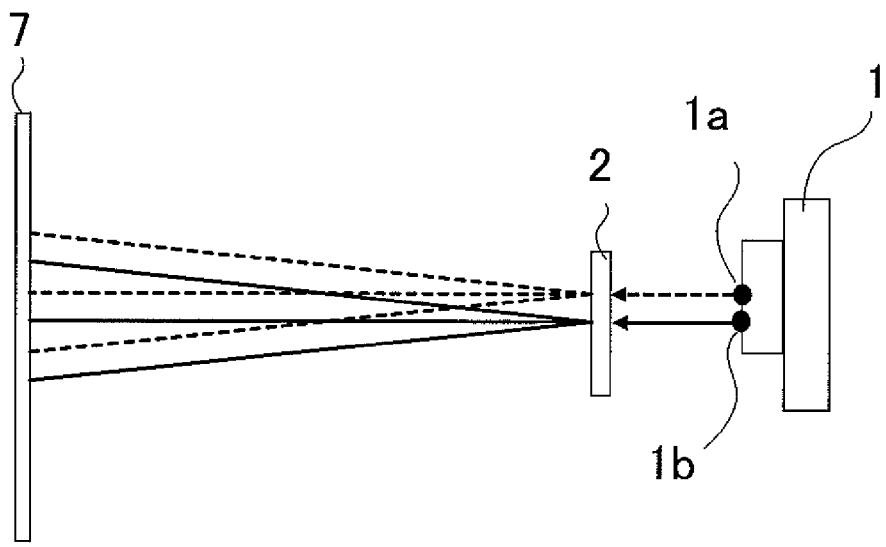
FIG. 4C illustrates how light beams emitted from emission points 1a and 1b are split by the diffractive element 2.

FIG. 4C schematically illustrates how the light beams that have been emitted from the emission points 1a and 1b get diffracted by the diffractive element 2.

Part or all of the optical system shown in FIG. 4A will also be used in common in the second through sixth embodiments to be described later.

In the example illustrated in FIG. 4A, each of the light beams that have been emitted from the emission points 1a and 1b is diffracted and branched by the diffractive element 2 into a zero-order light beam and ±first-order light beams as described above. These branched light beams pass through the polarization beam splitter 3 and are transformed into parallel light beams by the collimator lens 4. After that, those parallel light beams are transmitted through the wave plate 5 to turn into circularly polarized light beams and then condensed by the objective lens 6, thereby leaving respective light beam spots on the information storage layer of the optical storage medium 7. On the way back, the light that has been reflected from the optical storage medium 7 is transmitted through the objective lens 6 and the wave plate 5 to be transformed into plane polarized light, of which the polarization direction is perpendicular to the one on the way toward the optical storage medium. As a result, the reflected light is transmitted through the collimator lens 4 and reflected from the polarization beam splitter 3. After that, the reflected light is given astigmatism by the condenser lens 8 and then incident on the photodiodes on the photodetector 9. In FIG. 4A, the tracking direction of the optical storage medium 7 is supposed to be the direction coming out of the paper.

Figure 5A:
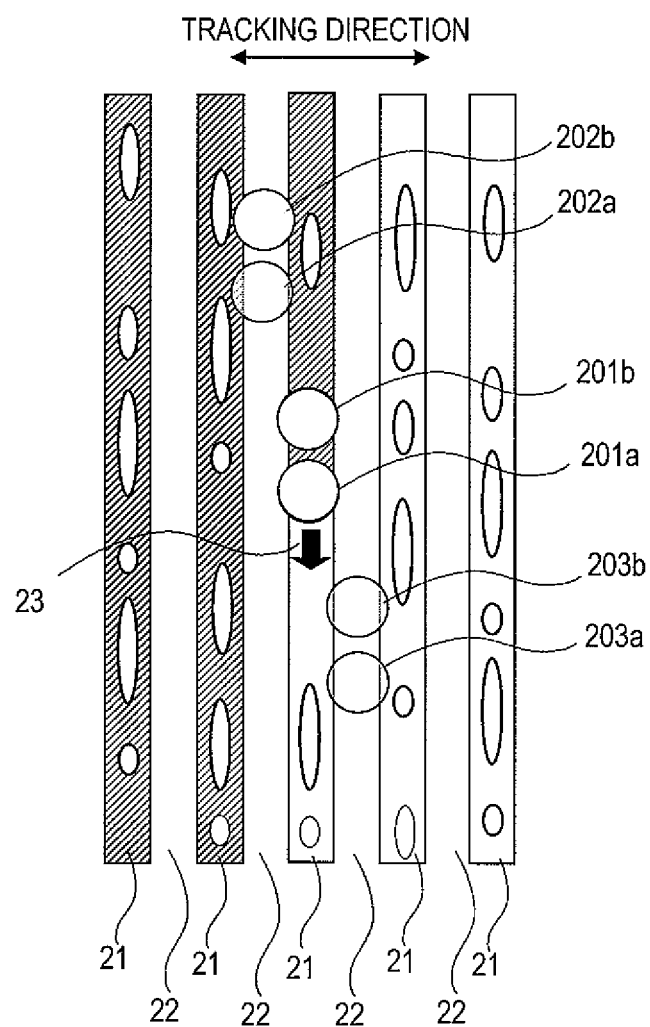
FIG. 5A illustrates how spots are left on an optical storage medium according to the first embodiment of the present disclosure.

FIG. 5A illustrates an exemplary arrangement of six light beam spots that have been formed on the information storage layer of the optical storage medium 7 by condensing those light beams on it.

In the example illustrated in FIG. 5A, the information storage layer of the optical storage medium 7 has unevenness. The light beam spots appear to move in the direction indicated by the arrow 23 along recording tracks 21 on which marks are going to be recorded (i.e., land portions or raised portions of the unevenness). Actually, however, those light beam spots are fixed and the optical storage medium 7 moves in the opposite direction to the one indicated by the arrow 23.

The write main light beam spot 201a is left on a track (land) 21 by the zero-order light beam that has been emitted from the emission point 1a and then transmitted through the diffractive element 2 shown in FIG. 4A. On the other hand, the ±first-order light beams that have been emitted from the emission point 1a and then diffracted by the diffractive element 2 shown in FIG. 4A are condensed between tracks (i.e., onto grooves 22), thereby forming write sub-light beam spots 202a and 203a there. Furthermore, the zero-order light beam that has been emitted from the emission point 1b and then transmitted through the diffractive element 2 is condensed onto another track (land) 21, thereby leaving a read main light beam spot 201b there. And the ±first-order light beams that have been emitted from the emission point 1a and then diffracted by the diffractive element 2 are condensed between tracks (i.e., onto grooves 22), thereby forming read sub-light beam spots 202b and 203b there.

In FIG. 5A, marks have already been left on the recording tracks on which marks are going to be recorded. That is to say, FIG. 5A illustrates how marks are overwritten on the existent recorded marks.

FIG. 5B illustrates an exemplary arrangement of photosensitive elements in the photodetector 9.

In FIG. 5B, the light beams that have left the light beam spots 201a, 201b, 202a, 202b, 203a and 203b on the optical storage medium 7 as shown in FIG. 5A are reflected from the information storage layer of the optical storage medium 7 to be incident on the photodetector 9 and form detected spots 301a, 301b, 302a, 302b, 303a and 303b there. In this description, the "detected spot" refers to a light beam spot that has been formed on the photosensitive plane of the photodetector 9 by the reflected light that has left its corresponding light beam spot on the optical storage medium 7.

As shown in FIG. 5B, the photodetector 9 includes twelve photosensitive elements, namely, photosensitive elements 31aa, 32ab, 33ac and 34ad, photosensitive elements 35ae and 36af, photosensitive elements 37ag and 38ah, and photosensitive elements 31bl, 32bj, 33bk and 34bl. The photosensitive elements 31aa, 32ab, 33ac and 34ad receive the light beam that has left the write main light beam spot 201a on the optical storage medium 7 and has just formed the detected spot 301a here. The photosensitive elements 35ae, 36af, 37ag and 38ah respectively receive the light beams that have left the write sub-light beam spots 202a and 203a on the optical storage medium 7 and have just formed the detected spots 302a and 303a here. In this embodiment, the respective photosensitive elements are photoelectric transducers, which are typically implemented as photodiodes. The respective photosensitive elements 31aa, 32ab, 33ac, 34ad, 35ae, 36af, 37ag, 38ah, 31bi, 32bj, 33bk and 34bl output signals A, B, C, D, E, F, G, H, I, J, K and L, respectively.

By performing arithmetic processing on these signals A through L, a tracking error signal TE, a focus error signal FE and a read signal RF can be generated. That arithmetic processing is typically carried out by a circuit in the optical pickup but may also be performed by an external circuit based on the output signals of the optical pickup.

$$MTE=(A+B)-(C+D) \tag{1}$$

$$STE=(E+G)-(F+H) \tag{2}$$

$$TE=MTE-\alpha \times STE \text{ (where } \alpha \text{ is a constant)} \tag{3}$$

$$FE=(A+C)-(B+D) \tag{4}$$

$$RF=I+J+K+L \tag{5}$$

That is to say, by performing an arithmetic operation on a push-pull signal MTE obtained by the photosensitive elements 31aa through 34ad that receive the reflected light that has left the write main light beam spot 201a to scan the recording track (land) with and on a push-pull signal STE obtained by the dual photosensitive elements 35aa, 36af, 37ag and 38ah that receive the reflected light that has left the two write sub-light beam spots 202a and 203a, a differential push-pull (DPP) TE signal can be obtained. As a result, an offset-free TE signal can be obtained.

Although not shown in FIG. 5B, if the signal obtained by the photosensitive elements 31aa through 34ad that receive the reflected light that has left the write main light beam spot 201a is used, the magnitude of the astigmatism given by the condenser lens 8 shown in FIG. 4A changes due to defocusing. As a result, the focus error signal can be generated by the astigmatism method using Equation (4).

In the photodetector 9, the photosensitive elements 31bi, 32bj, 33bk and 34bl receive a reflected light beam that forms the read main detected spot 301b there. However, the respective photosensitive elements of the photodetector 9 are arranged so as not to receive reflected light beams that leave read sub-detected spots 302b and 303b.

With such an arrangement adopted, while performing a write operation with good stability by generating a stabilized TE signal, which will never produce an offset due to lens shifting, for example, using the write main detected spot 301a and sub-detected spots 302a and 303a, a read operation can also be performed using the read main detected spot 301b. As a result, photosensitive elements to receive light beams that leave the read sub-detected spots 302b and 303b can be omitted, and therefore, a downsized inexpensive optical pickup is realized.

Figure 6A:
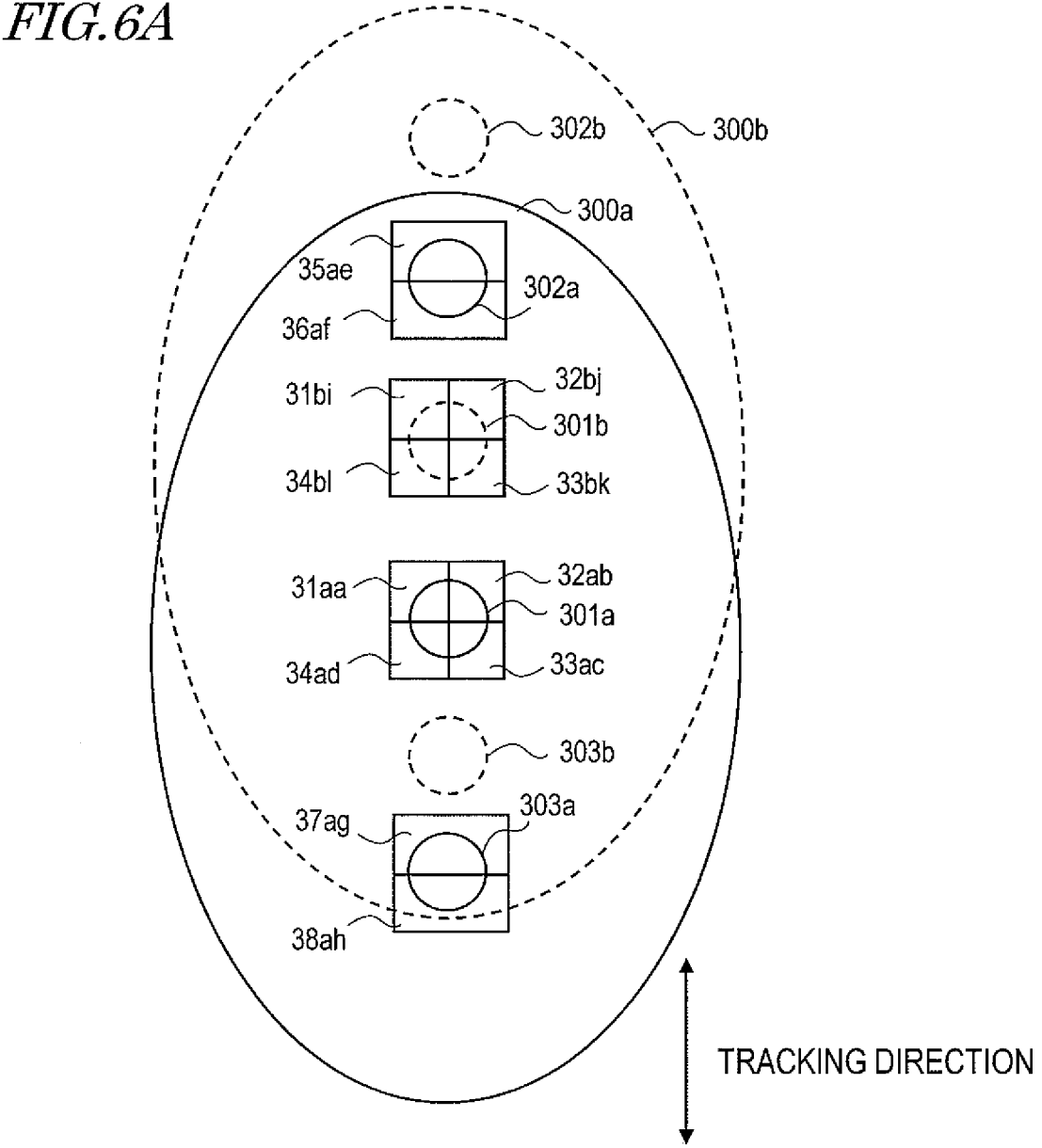
FIG. 6A illustrates stray light rays to enter the photodetector of the first embodiment of the present disclosure.

Next, it will be described with reference to FIGS. 6A through 6C what if the optical storage medium 7 has multiple information storage layers. FIGS. 6A through 6C illustrate stray light rays that will enter the photodetector 9 of the first embodiment.

While data is being read from, or written on, a target one of the information storage layers of the optical storage medium 7, the condensed read and write light beam spots are on the target information storage layer. However, light may also be reflected from another information storage layer that the incoming light passes before reaching the target layer or even from still another information storage layer that the incoming light may enter after having been incident on that target layer. Those reflected light rays (i.e., stray light rays) are incident on, and reflected from, those information storage layers after having defocused. As a result, as shown in FIG. 6A, a stray light ray 300a involved with the write main light beam spot and another stray light ray 300b involved with the read main light beam spot 300b are incident on the photodetector 9 after having defocused.

In this case, the stray light ray 300a involved with the write main light beam spot has had its quantity changed due to modulation of the write light beam. That is why its modulation component is added to the information signal represented by Equation (5).

By using a signal representing reflected light that has left the write sub-light beam spot 302a or 303a that is not affected by any variation in reflectance due to the presence of a recorded mark while a write operation is being performed on the optical storage medium, the modulated signal can be obtained by $$MS=E+F \text{ or } MS=G+H \tag{6}$$

Consequently, in this case, the information signal obtained from the optical storage medium is calculated by $$RF'=I+J+K+L-\beta \times MS \text{ (where } \beta \text{ is a constant)} \tag{7}$$

Optionally, in order to cancel the variation in the intensity of light due to the modulation of the light, the information signal may also be calculated by $$RF''=(I+J+K+L)/MS \tag{8}$$

Furthermore, if the information signal is calculated by $$RF'''=(I+J+K+L-\beta MS)/MS \tag{9}$$

then the influence of the variation in the intensity of light due to the modulation of the light on the information signal can be reduced.

In general, the intensity of light of the write main light beam spot is approximately ten times as high as that of the read main light beam spot, and the intensity of the stray light is approximately one tenth of that of the reflected light that has left a light beam spot on the information storage layer. That is why the intensity of the stray light 30b involved with the read main light beam spot is much lower than that of the reflected light that has left the write main or sub-detected spot. Consequently, there is only a little influence of the stray light 30b on the TE signal obtained based on the write main and sub-detected spots.

Likewise, as for the write and read sub-light beam spots, there are also light rays that are reflected from another information storage layer and incident on the photodetector 9 after having defocused. However, those stray light rays will reach points that are too far away from the respective photosensitive elements 31aa, 32ab, 33ac, 34ad, 35ae, 36af, 37ag, 38ah, 31bi, 32bj, 33bk and 34bl to be incident on any of those photosensitive elements. For that reason, there is no need to consider those stray light rays.

Optionally, to eliminate the influence of the stray light, an opaque region may be provided for a portion of the optical system that the stray light passes on its way back from the optical storage medium. FIG. 6B illustrates the condenser lens 8 as viewed from the polarization beam splitter 3. In FIG. 6B, illustrated are the profile 101 of the condenser lens, the range 103 through which the light reflected from the information storage layer on which a write operation is being performed passes, the range 104 through which the light reflected from the information storage layer on which a read operation is being performed passes, and an opaque region 102 that does not transmit light.

In this case, the opaque region 102 is defined to be approximately as large as a part 310a of the stray light involved with the write main light beam spot, which has entered the condenser lens 8 and then been incident on the photodetector 9 as shown in FIG. 6C, when that part 310a is projected onto the condenser lens 8 in FIG. 6B.

That is why of the stray light 300a involved with the write main light beam spot, its parts that would be incident on the photosensitive elements 31bi, 32bj, 33bk and 34bl to receive the light that forms the read main detected spot on the photodetector 9 can be removed almost entirely and the reflected light that has left the read main light beam spot can be detected without being affected by the stray light. As a result, an information signal of good quality can be obtained.

By adopting such a configuration, even if the optical storage medium has multiple information storage layers, the influence of the stray light that has come from a different information storage layer from the target of the read/write operation can be eliminated or reduced significantly to say the least. As a result, not only a write operation but also reading an information signal can be performed with good stability.

Embodiment 2

Hereinafter, an optical pickup as a second embodiment of the present disclosure will be described with reference to FIGS. 7A through 9B.

In the following description, any component having substantially the same function as its counterpart that has already been described for the related art or the first embodiment is identified by the same reference numeral.

Figure 7A:
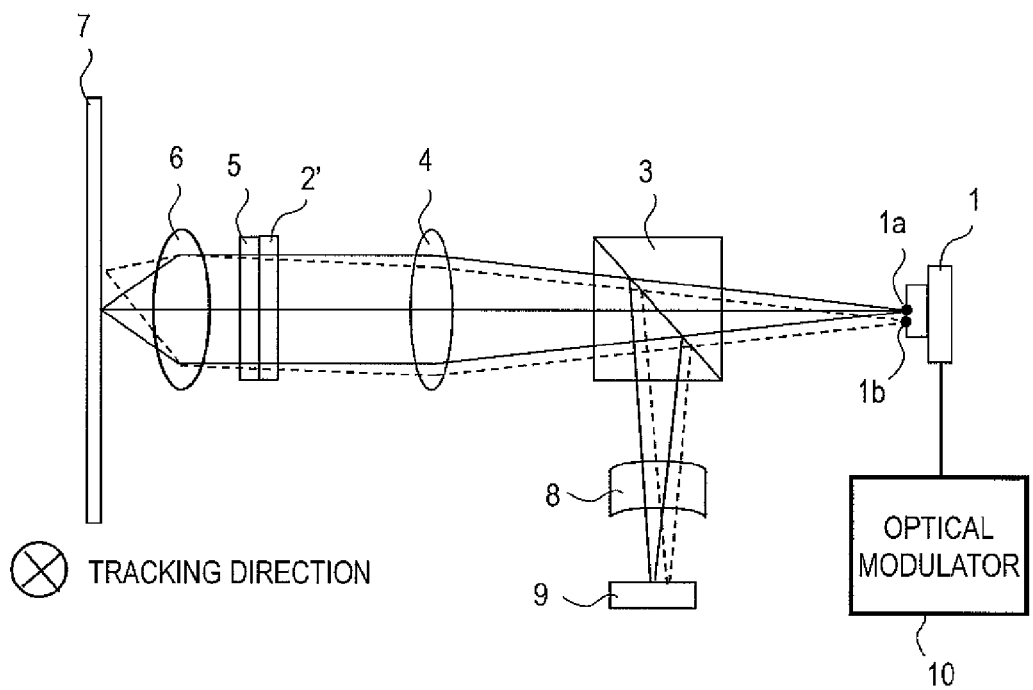
FIG. 7A illustrates an arrangement for an optical pickup according to a second embodiment of the present disclosure.

As shown in FIG. 7A, an optical pickup according to this embodiment includes a laser light source 1 with multiple emission points 1a and 1b, an optical modulator 10 which forms a recorded mark on the optical storage medium 7, an objective lens 6 which condenses the diffracted light onto the information storage layer of the optical storage medium 7, a polarizing diffractive element 2' which diffracts the light that has been reflected from the optical storage medium 7 and which branches it into a zero-order light beam and ±first-order light beams, and a photodetector 9 which receives those light beams. With this optical pickup, while a write operation is being performed with the light that has been emitted from the emission point 1a, a read signal can be obtained with the light that has been emitted from the emission point 1b.

In the example illustrated in FIG. 7A, each of the light beams that have been emitted from the emission points 1a and 1b is passed through the polarization beam splitter 3 and transformed into parallel light beams by the collimator lens 4. After that, those parallel light beams are transmitted through the polarizing diffractive element 2', which has the property of totally transmitting the light emitted from the emission point 1a, 1b in its polarization direction, and then passed through the wave plate 5 to turn into circularly polarized light beams and then condensed by the objective lens 6, thereby leaving respective light beam spots on the information storage layer of the optical storage medium 7. On the way back, the light that has been reflected from the optical storage medium 7 is transmitted through the objective lens 6 and the wave plate 5 to be transformed into plane polarized light, of which the polarization direction is perpendicular to the one on the way toward the optical storage medium. After that, the light gets diffracted and branched into a zero-order light beam and ±first-order light beams by the polarizing diffractive element 2' that diffracts the light in that polarization direction. In FIG. 7A, the tracking direction of the optical storage medium 7 is supposed to be the direction coming out of the paper.

Figure 7B:
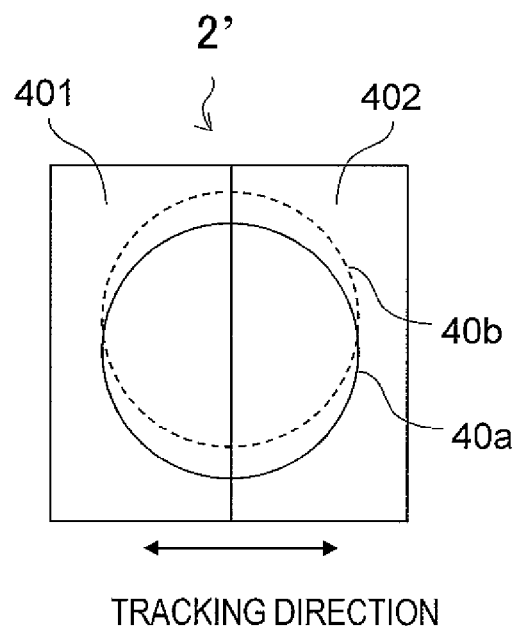
FIG. 7B illustrates a configuration for the optical pickup of the second embodiment.

As shown in FIG. 7B, the polarizing diffractive element 2' has two divided areas 401 and 402, which are defined by a line segment that is drawn perpendicularly to the tracking direction of the optical storage medium 7. The light, which selectively turns ON, according to its polarization direction, the diffraction function of the polarizing diffractive element 2', gets diffracted and branched into a zero-order light beam and ±first-order light beams by these areas 401 and 402. In FIG. 7B, illustrated are the area 40a through which the reflected light that has left the write light beam spot passes and the area 40b through which the reflected light that has left the read light beam spot passes.

As shown in FIG. 7A, the three light beams that have been branched by the polarizing diffractive element 2' are transmitted through the collimator lens 4, reflected from the polarization beam splitter 3, given astigmatism by the condenser lens 8, and then incident on the photosensitive elements of the photodetector 9.

In this embodiment, the objective lens 6, the wave plate 5 and the polarizing diffractive element 2' are combined together. That is why the objective lens 6, the wave plate 5 and the polarizing diffractive element 2' are driven together by an actuator (not shown), thereby performing focus and tracking controls on the optical storage medium 7.

Figure 8A:
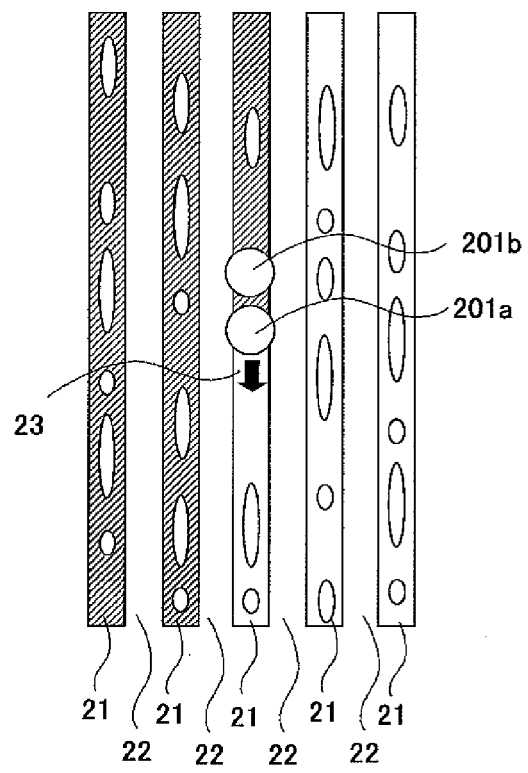
FIG. 8A illustrates how spots are left on an optical storage medium in a modified example of the second embodiment.

FIG. 8A illustrates an exemplary arrangement of light beam spots that have been formed on the information storage layer of the optical storage medium 7 by condensing those light beams on it.

In the example illustrated in FIG. 8A, the information storage layer of the optical storage medium 7 has unevenness. The optical storage medium 7 appear to be scanned in the direction indicated by the arrow 23 along recording tracks 21 on which marks are going to be recorded (i.e., land portions or raised portions of the unevenness). Actually, however, those light beam spots are fixed and the optical storage medium 7 moves in the opposite direction to the one indicated by the arrow 23.

The write light beam spot 201a is left by the light beam that has been emitted from the emission point 1a, while the read light beam spot 201b is left by the light beam that has been emitted from the emission point 1b.

Figure 8B:
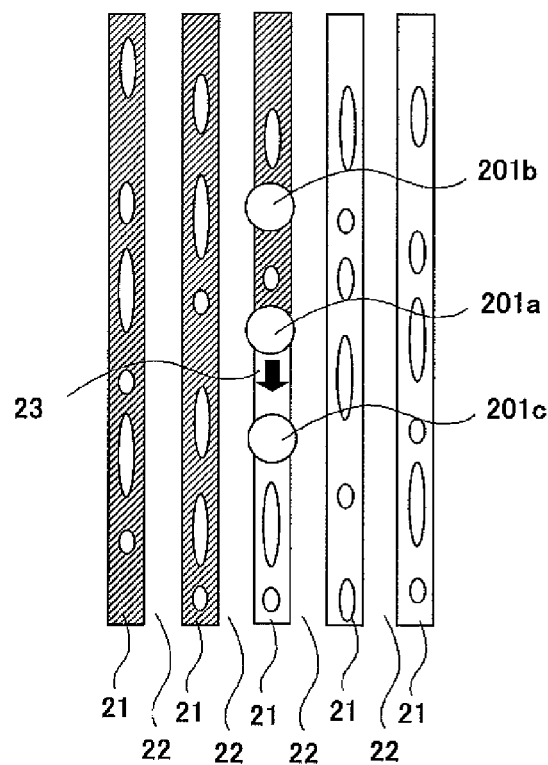
FIG. 8B illustrates an arrangement for a photodetector according to the second embodiment of the present disclosure.
Figure 8C:
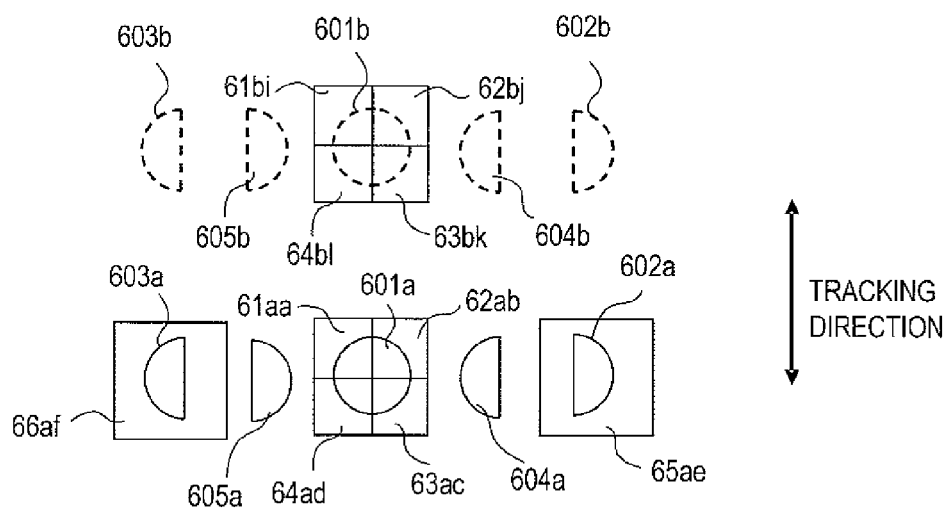
FIG. 8C illustrates an arrangement for a photodetector according to the second embodiment of the present disclosure.

FIG. 8C illustrates an exemplary arrangement of photosensitive elements in the photodetector 9.

In the example illustrated in FIG. 8C, of the reflected light that has left the write light beam spot 201a shown in FIG. 8A, the zero-order light beam that has been split by the polarizing diffractive element 2' is incident on the photodetector 9 and forms a write main detected spot 601a there. Meanwhile, ±first-order light beams that have been produced by the area 401 are incident on the photodetector 9 and form write sub-detected spots 603a and 604a there. And the ±first-order light beams that have been produced by the area 402 are incident on the photodetector 9 and form write sub-detected spots 602a and 605a there.

On the other hand, of the reflected light that has left the read light beam spot 201b, the zero-order light beam that has been split by the polarizing diffractive element 2' is incident on the photodetector 9 and forms a read main detected spot 601b there. Meanwhile, the ±first-order light beams that have been produced by the area 401 are incident on the photodetector 9 and form read sub-detected spots 603b and 604b there. And the ±first-order light beams that have been produced by the area 402 are incident on the photodetector 9 and form read sub-detected spots 602b and 605b there.

In the example illustrated in FIG. 8C, the photodetector 9 includes ten photosensitive elements 61aa, 62ab, 63ac, 64ad, 65ae, 66af, 61bi, 62bj, 63bk and 64bl. The photosensitive elements 61aa, 62ab, 63ac and 64ad receive a light beam that has left the write main detected spot 601a. The photosensitive elements 65ae and 66af receive light beams that have left the write sub-detected spots 602a and 603a, respectively. These divided photosensitive elements 61aa, 62ab, 63ac, 64ad, 65ae, 66af, 61bi, 62bj, 63bk and 64bl output signals A, B, C, D, E, F, I, J, K and L, respectively.

By performing arithmetic processing on these signals A through L, a tracking error signal TE, a focus error signal FE and a read signal RF can be generated.

$$MTE = (A+B) - (C+D) \quad (1)$$

$$STE = E - F \quad (10)$$

$$TE = MTE - \gamma \times STE \text{ (where } \gamma \text{ is a constant)} \quad (11)$$

$$FE = (A+C) - (B+D) \quad (4)$$

$$RF = I + J + K + L \quad (5)$$

That is to say, by performing an arithmetic operation on a push-pull signal MTE obtained by the photosensitive elements 61aa through 64ad that receive the reflected light that forms the write main detected spot 601a, which is the zero-order light beam produced by the polarizing diffractive element 2' from the reflected light that has left the write light beam spot 201a to scan the recording track (land) with and a push-pull signal STE obtained by the photosensitive elements 65ae and 66af that receive the reflected light beams that form the write sub-detected spots 602a and 603a, which are the ±first-order light beams produced by the polarizing diffractive element 2', an offset-free TE signal can be obtained.

The reason will be described briefly below.

In the example illustrated in FIG. 8A, when the objective lens 6 moves (along with the wave plate 5 and the polarizing diffractive element 2') in the tracking direction (i.e., when a lens shift occurs) to perform a tracking operation, the main detected spot 601a shown in FIG. 9A moves vertically on the paper in the tracking direction that is indicated by the arrow in FIG. 8A. That is why MTE represented by Equation (1) has an offset.

On the other hand, the reflected light that has left the write light beam spot and entered the polarizing diffractive element 2' comes to have its light intensity distribution shifted in the tracking direction in the area 40a. As a result, the reflected light beams that have passed through the areas 401 and 402 come to have different light intensities. As a result, the write sub-detected spots 602a and 603a formed on the photodetector 9 by the light beams that have passed through those areas also have different light intensities. Consequently, STE obtained by Equation (10) has an offset.

Therefore, due to the lens shift, each of MTE and STE comes to have an offset, and the magnitude of offset produced is substantially proportional to the magnitude of the lens shift. That is why if an appropriate constant γ is set as in Equation (11), a TE that does not produce any offset can be obtained irrespective of the lens shift.

If the signal obtained by the photosensitive elements 61*aa* through 64*ad* that receive the reflected light that has left the write light beam spot 201*a* is used, the magnitude of the astigmatism given by the condenser lens 8 shown in FIG. 7A changes due to defocusing. As a result, the focus error signal can be generated by the astigmatism method using Equation (4).

On the other hand, in the photodetector 9 of this embodiment, the photosensitive elements 61*bi*, 62*bj*, 63*bk* and 64*bl* receive a reflected light beam that forms the read main detected spot 601*b* there. However, reflected light beams that leave read sub-detected spots 602*b*, 603*b*, 604*b* and 605*b* are not received by any photosensitive element.

With such an arrangement adopted, while performing a write operation with good stability by generating a stabilized TE signal, which will never produce an offset due to lens shifting, for example, using the write main detected spot and sub-detected spots, a read operation can also be performed using the read main detected spot. As a result, photosensitive elements to receive light beams that leave the read sub-detected spots can be omitted, and therefore, a downsized inexpensive optical pickup is realized.

Next, it will be described with reference to FIGS. 9A and 9B what if the optical storage medium 7 has multiple information storage layers.

FIG. 9A illustrates stray light rays that will enter the photodetector of the second embodiment.

While data is being read from, or written on, a target one of the information storage layers of the optical storage medium 7, the condensed read and write light beam spots 201*b* and 201*a* are on the target information storage layer. However, light may also be reflected from another information storage layer that the incoming light passes before reaching the target layer or even from still another information storage layer that the incoming light may enter after having been incident on that target layer. Those reflected light rays (i.e., stray light rays) are incident on, and reflected from, those information storage layers after having defocused. As a result, as shown in FIG. 9A, a stray light ray 600*a* involved with the write light beam spot 201*a* and another stray light ray 600*b* involved with the read light beam spot 201*b* are incident on the photodetector 9 after having defocused.

In this case, the stray light ray 600*a* involved with the write light beam spot 201*a* has had its quantity changed due to modulation of the write light beam. That is why its modulation component is added to the information signal represented by Equation (5).

By using a signal representing reflected light that has left the write sub-detected spot 602*a* or 603*b* that is not affected by any variation in reflectance while a write operation is being performed on the optical storage medium, the modulated signal can be obtained by $$MS = E + F \quad (6)$$

Consequently, in this case, the information signal obtained from the optical storage medium is calculated by $$RF' = I + J + K + L - \beta \times MS \text{ (where } \beta \text{ is a constant)} \quad (7)$$

Optionally, in order to cancel the variation in the intensity of light due to the modulation of the light, the information signal may also be calculated by $$RF'' = (I + J + K + L)/MS \quad (8)$$

Furthermore, if the information signal is calculated by $$RF''' = (I + J + K + L - \beta MS)/MS \quad (9)$$

then the influence of the variation in the intensity of light due to the modulation of the light on the information signal can be reduced.

In general, the intensity of light of the write light beam spot 201*a* is approximately ten times as high as that of the read light beam spot 201*b*, and the intensity of the stray light is approximately one tenth of that of the reflected light that has left a light beam spot on the information storage layer. That is why the intensity of the stray light 600*b* involved with the read light beam spot 201*b* is much lower than that of the reflected light that has left the write main or sub-detected spot. Consequently, there is only a little influence of the stray light 600*b* on the TE signal obtained based on the write main and sub-detected spots.

Likewise, as for the read light beam spot, there is also a light ray that is reflected from another information storage layer and incident on the photodetector 9 after having defocused. However, that stray light ray involved with the read light beam spot 201*b* that has been reflected from another information storage layer will reach points that are too far away from the respective photosensitive elements 61*aa*, 62*ab*, 63*ac*, 64*ad*, 65*ae*, 66*af*, 61*bi*, 62*bj*, 63*bk* and 64*bl* to be incident on any of those photosensitive elements. For that reason, there is no need to consider that stray light ray involved with the read light beam spot 201*b*.

Figure 7C:
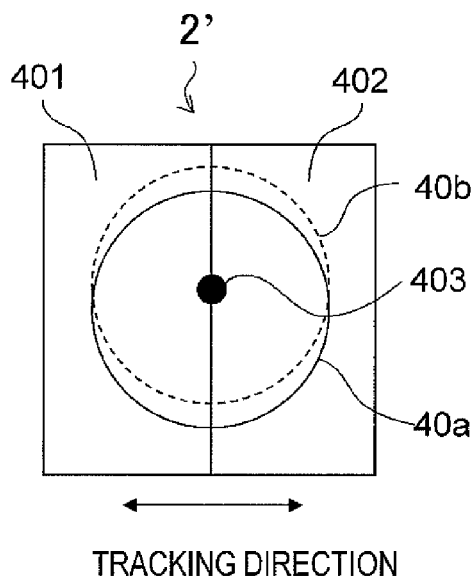
FIG. 7C illustrates a configuration for the optical pickup of the second embodiment.

Optionally, to eliminate the influence of the stray light, an opaque region may be provided for a portion of the optical system that the stray light passes on its way back from the optical storage medium. FIG. 7C illustrates an example of the polarizing diffractive element 2' with such an opaque region. In FIG. 7C, illustrated are the range 40*a* through which the light reflected from the information storage layer on which a write operation is being performed passes, and the range 40*b* through which the light reflected from the information storage layer on which a read operation is being performed passes. This polarizing diffractive element 2' has an opaque region 403 that does not transmit light and that acts only on the light that has been reflected from the optical storage medium 7. That is to say, the opaque region 403 has the property of totally transmitting the light that has been emitted from the emission points 1*a* and 1*b* in its polarization direction but cutting off light, of which the polarization direction intersects with the former polarization direction at right angles, just like the polarizing diffractive element 2'.

In this case, the opaque region 403 is defined to be approximately as large as a part 610*a* of the stray light involved with the write light beam spot, which has been incident on the photodetector 9, when that part 610*a* is projected onto the polarizing diffractive element 2' in FIG. 9B.

That is why of the stray light 600*a* involved with the write light beam spot 201*a*, its parts that would be incident on the photosensitive elements 61*bi*, 62*bj*, 63*bk* and 64*bl* to receive the light that forms the read main detected spot on the photodetector 9 can be removed almost entirely and the reflected light that has left the read main light beam spot can be detected without being affected by the stray light. As a result, an information signal of good quality can be obtained.

By adopting such a configuration, even if the optical storage medium has multiple information storage layers, the influence of the stray light that has come from a different information storage layer from the target of the read/write operation can be eliminated or reduced significantly to say the least. As a result, not only a write operation but also reading an information signal can be performed with good stability.

In the embodiment described above, the laser light source 1 is supposed to have a plurality of emission points. However, even if an arrangement in which the laser light source 1 has only one emission point and in which a light beam that has been emitted from the laser light source 1 is split into a write light beam and a read light beam by a diffractive element 2 is adopted as shown in FIG. 7D, the detector arrangement of this embodiment can also be used effectively.

Figure 7D:
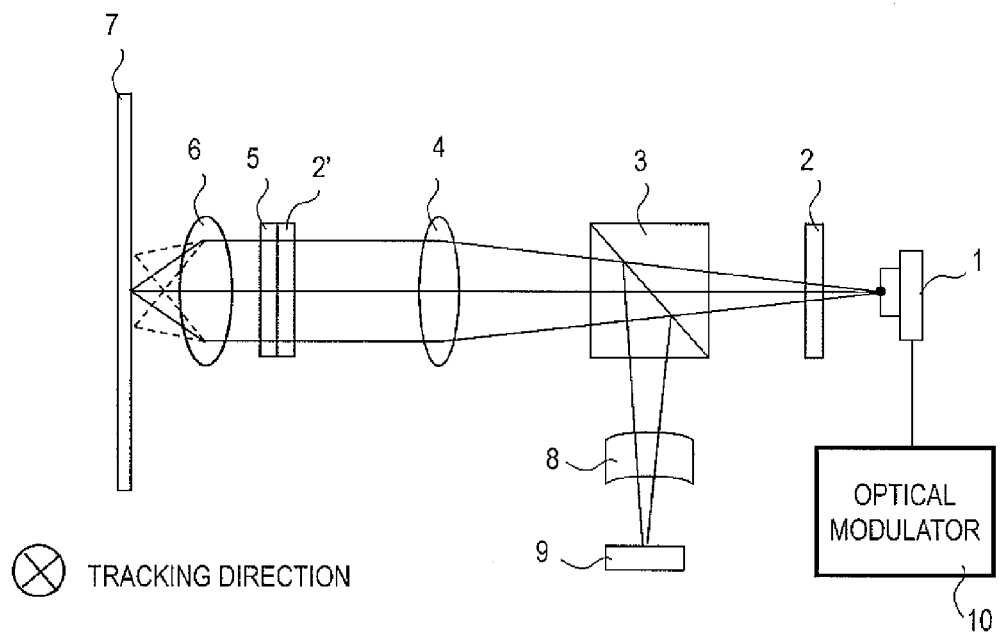
FIG. 7D illustrates an alternative arrangement for the optical pickup of the second embodiment.

In FIG. 7D, the diffractive element 2 functioning as an optical branching element splits the light beam that has been emitted from the laser light source 1 into a zero-order light beam to be a write light beam and ±first-order light beams to be read beams. In that case, the condensed light beam spots formed by the objective lens 6 on the optical storage medium 7 are a write light beam spot 201*a* and read light beam spots 201*b* and 201*c* as shown in FIG. 8B.

In this case, the light that has left the write light beam spot 201*a* and then been reflected from the optical storage medium 7 gets diffracted by the polarizing diffractive element 2', thereby leaving a write main detected spot 601*a* and write sub-detected spots 602*a* and 603*a*. On the other hand, the light that has left the read light beam spot 201*b* and then been reflected from the optical storage medium 7 forms a read detected spot 601*b*. Thus, by adopting the configuration described above, this embodiment can also be applied.

It should be noted that the reflected light that has left the read light beam spot 201*c* is not received by any photosensitive element on the photodetector 9.

Consequently, even if the laser light source has only one emission point, while performing a write operation with good stability by generating a stabilized TE signal, which will never produce an offset due to lens shifting, for example, using the write light beam spot, a downsized inexpensive optical pickup is realized. In addition, even if the optical storage medium has multiple information storage layers, the influence of the stray light that has come from a different information storage layer from the target of the read/write operation can be reduced significantly. As a result, not only a write operation but also reading an information signal can be performed with good stability as well.

Embodiment 3

Hereinafter, an optical pickup as a third embodiment of the present disclosure will be described with reference to FIGS. 10A through 11C. In the following description, any component having substantially the same function as its counterpart that has already been described for the related art or the first or second embodiment is identified by the same reference numeral.

Figure 10A:
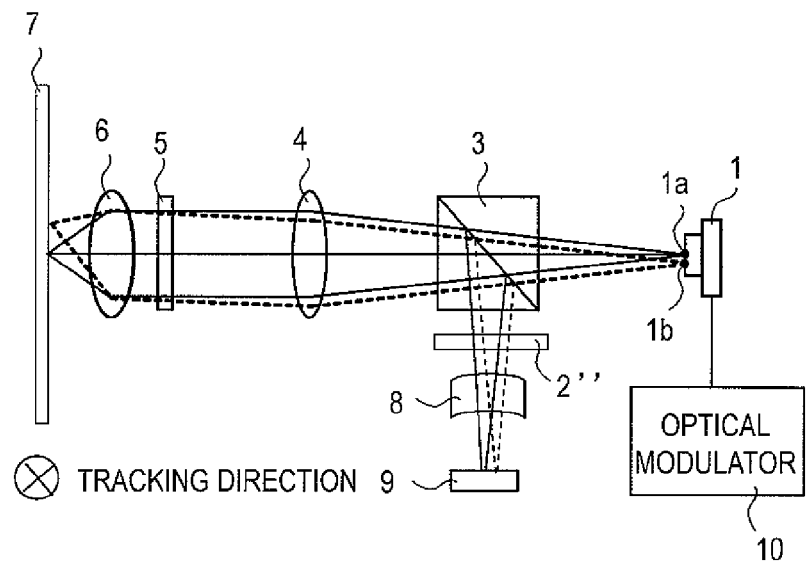
FIG. 10A illustrates an arrangement for an optical pickup according to a third embodiment of the present disclosure.

As shown in FIG. 10A, an optical pickup according to this embodiment includes a laser light source 1 with multiple emission points 1*a* and 1*b*, an optical modulator 10 which forms a recorded mark on the optical storage medium 7, a lens 6 which condenses diffracted light onto the information storage layer of the optical storage medium 7, a diffractive element 2" which diffracts the light that has been reflected from the optical storage medium 7 and which branches it into a zero-order light beam and ±first-order light beams, and a photodetector 9 which receives those light beams. With this optical pickup, while a write operation is being performed with the light that has been emitted from the emission point 1*a*, a read signal can be obtained with the light that has been emitted from the emission point 1*b*.

In the example illustrated in FIG. 10A, each of the light beams that have been emitted from the emission points 1*a* and 1*b* is passed through the polarization beam splitter 3 and transformed into parallel light beams by the collimator lens 4. After that, those parallel light beams are passed through the wave plate 5 to turn into circularly polarized light beams and then condensed by the objective lens 6, thereby leaving respective light beam spots on the information storage layer of the optical storage medium 7. On the way back, the light that has been reflected from the optical storage medium 7 is transmitted through the objective lens 6 and the wave plate 5 to be transformed into plane polarized light, of which the polarization direction is perpendicular to the one on the way toward the optical storage medium. Next, the reflected light is transmitted through the collimator lens 4, reflected from the polarization beam splitter 3, and then branched into a zero-order light beam and ±first-order light beams by the diffractive element 2". Thereafter, those light beams are given astigmatism by the condenser lens 8 and then incident on the photosensitive elements of the photodetector 9. In FIG. 10A, the tracking direction of the optical storage medium 7 is supposed to be the direction coming out of the paper.

Figure 10B:
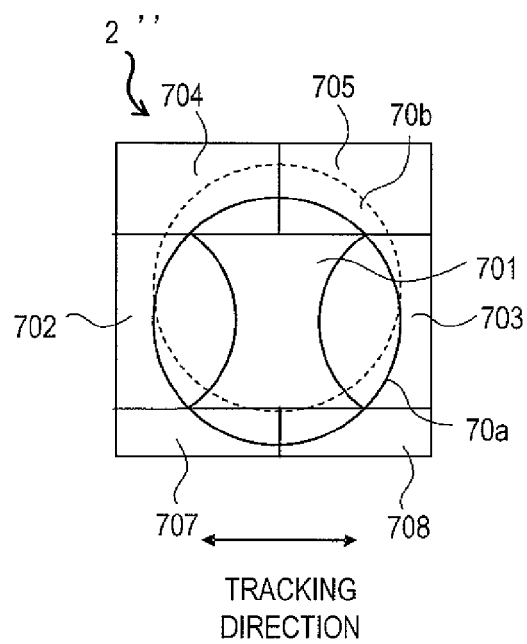
FIG. 10B illustrates a configuration for the optical pickup of the third embodiment.

As shown in FIG. 10B, the diffractive element 2" has seven divided areas 701 through 708, in which the incoming light is split into a zero-order light beam to leave a main spot and ±first-order light beams to leave sub-spots. In FIG. 10B, illustrated are the area 70*a* through which the reflected light that has left the write light beam spot passes and the area 70*b* through which the reflected light that has left the read light beam spot passes.

The light beam spots that have been formed on the information storage layer of the optical storage medium 7 by condensing those reflected light beams on it may be arranged as shown in FIG. 8A.

In the example illustrated in FIG. 8A, the information storage layer of the optical storage medium 7 has unevenness. The optical storage medium 7 appear to be scanned in the direction indicated by the arrow 23 along recording tracks 21 on which marks are going to be recorded (i.e., land portions or raised portions of the unevenness). Actually, however, those light beam spots are fixed and the optical storage medium 7 moves in the opposite direction to the one indicated by the arrow 23. The write light beam spot 201*a* is left by the light beam that has been emitted from the emission point 1*a*, while the read light beam spot 201*b* is left by the light beam that has been emitted from the emission point 1*b*.

Figure 11A:
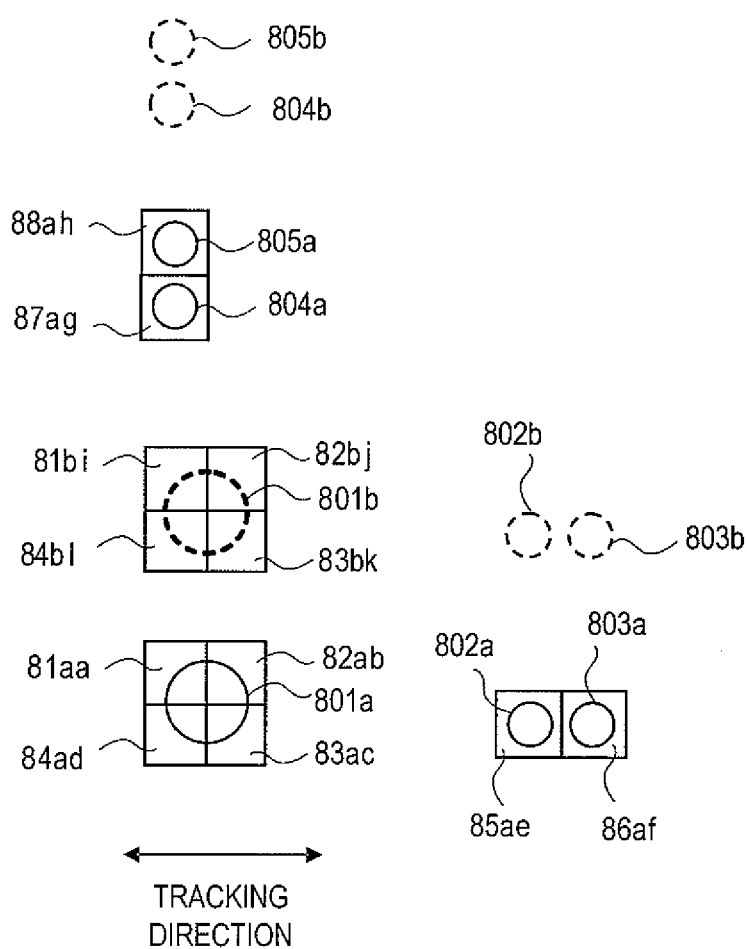
FIG. 11A illustrates an arrangement for a photodetector according to the third embodiment of the present disclosure.
Figure 11C:
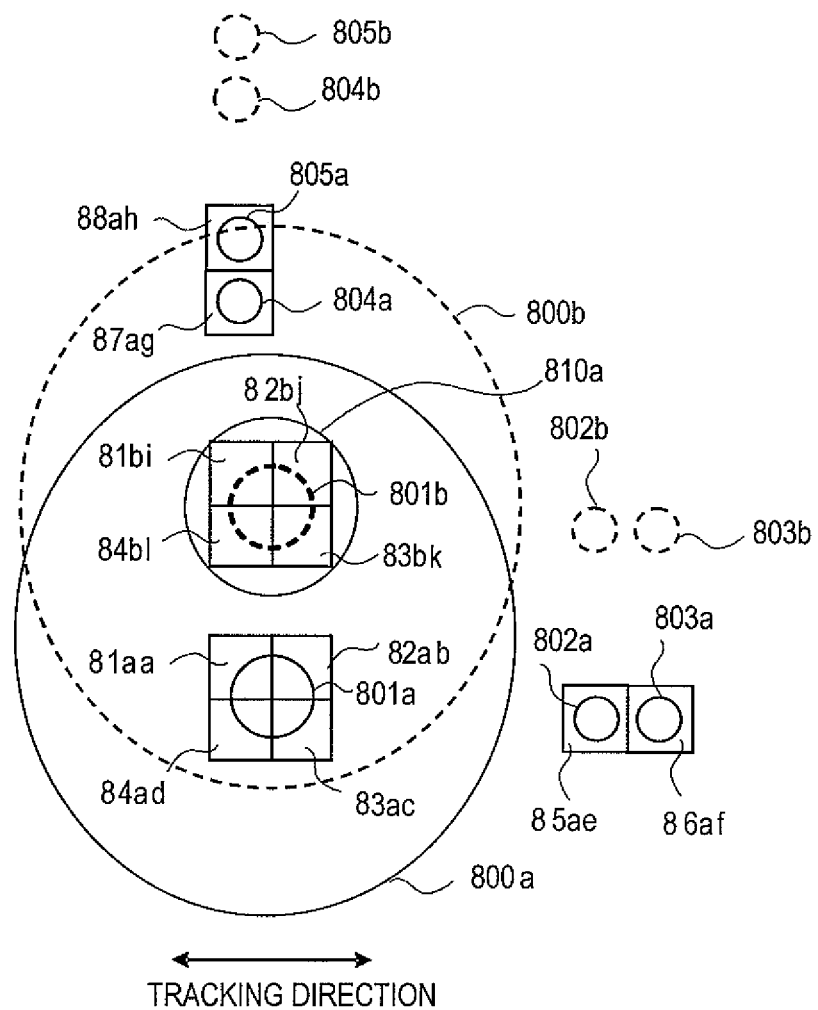
FIG. 11C illustrates stray light rays to enter the photodetector of the third embodiment.

FIG. 11A illustrates an exemplary arrangement of photosensitive elements in the photodetector 9.

In the example illustrated in FIG. 11A, of the reflected light that has left the write light beam spot 201*a* shown in FIG. 8A, the zero-order light beam that has been split by the diffractive element 2" is incident on the photodetector 9 and forms a write main detected spot 801*a* there. Meanwhile, the +first-order light beam that has been produced by the area 702 is incident on the photodetector 9 and forms a write sub-detected spot 802*a* there. The +first-order light beam that has been produced by the area 703 is incident on the photodetector 9 and forms a write sub-detected spot 803*a* there. The +first-order light beam that has been produced by the areas 704 and 707 is incident on the photodetector 9 and forms a write sub-detected spot 804*a* there. And the +first-order light beam that has been produced by the areas 705 and 708 is incident on the photodetector 9 and forms a write sub-detected spot 805*a* there.

On the other hand, of the reflected light that has left the read light beam spot 201b, the zero-order light beam that has been split by the diffractive element 2" is incident on the photodetector 9 and forms a read main detected spot 801b there. Meanwhile, the +first-order light beam that has been produced by the area 702 is incident on the photodetector 9 and forms a read sub-detected spot 802b there. The +first-order light beam that has been produced by the area 703 is incident on the photodetector 9 and forms a read sub-detected spot 803b there. The +first-order light beam that has been produced by the areas 704 and 707 is incident on the photodetector 9 and forms a read sub-detected spot 804b there. And the +first-order light beam that has been produced by the areas 705 and 708 is incident on the photodetector 9 and forms a read sub-detected spot 805b there.

In the example illustrated in FIG. 11A, the photodetector 9 includes twelve photosensitive elements 81aa, 82ab, 83ac, 84ad, 85ae, 86af, 87ag, 88ah, 81bi, 82bj, 83bk and 84bl. The photosensitive elements 81aa, 82ab, 83ac and 84ad receive a light beam that has left the write main detected spot 801a. The photosensitive elements 85ae, 86af, 87ag and 88ah receive light beams that have left the write sub-detected spots 802a, 803a, 804a and 805a, respectively. And the photosensitive elements 81bi, 82bj, 83bk and 84bl receive a light beam that has left the read main detected spot 801b.

The ±first-order light beams produced by the area 701 of the diffractive element 2" and the –first-order light beam produced by the areas 702 through 708 will reach points that are too far away from the respective photosensitive elements 81aa, 82ab, 83ac, 84ad, 85ae, 86af, 87ag, 88ah, 81bi, 82bj, 83bk and 84bl on the photodetector 9 to be incident on any of those photosensitive elements. For that reason, those light beams are not illustrated in FIG. 11A.

In this case, these divided photosensitive elements 81aa, 82ab, 83ac, 84ad, 85ae, 86af, 87ag, 88ah, 81bi, 82bj, 83bk and 84bl output signals A, B, C, D, E, F, I, J, K and L, respectively.

By performing arithmetic processing on these signals A through L, a tracking error signal TE, a focus error signal FE and a read signal RF can be generated.

$$MTE = E - F \quad (12)$$

$$STE = G - H \quad (13)$$

$$TE = MTE - \delta \times STE \text{ (where } \delta \text{ is a constant)} \quad (14)$$

$$FE = (A+C) - (B+D) \quad (4)$$

$$RF = I + J + K + L \quad (5)$$

In this case, in the area 70a of the diffractive element 2" which the reflected light that has left the write light beam spot is incident on and then passes through, only the zero-order diffracted light beam that is not reflected by a track with any shape on the information storage layer of the optical storage medium 7 is incident on the areas 704, 705, 707 and 708. On the other hand, the first-order diffracted light beams that have been reflected from a track on the information storage layer of the optical storage medium 7 and the zero-order diffracted light beam are incident on, and superpose one upon the other in, the areas 702 and 703.

That is why if the objective lens 6 has shifted in the tracking direction (i.e., if lens shift has occurred) during the tracking operation as shown in FIG. 10A, then the reflected light that has left the write light beam spot shown in FIG. 10B shifts horizontally on the paper in the tracking direction indicated by the arrow in FIG. 10B. As a result, MTE and STE represented by Equations (12) and (13) come to have offsets according to the magnitudes of the lens shift. Consequently, by setting an appropriate constant δ in Equation (14), a TE that does not produce any offset can be obtained in spite of the lens shift.

If the signal obtained by the photosensitive elements 81aa, 82ab, 83ac and 84ad that receive the reflected light that has left the write light beam spot 201a is used, the magnitude of the astigmatism given by the condenser lens 8 shown in FIG. 10A changes due to defocusing. As a result, the focus error signal can be generated by the astigmatism method using Equation (4).

On the other hand, in the photodetector 9, the photosensitive elements 81bi, 82bj, 83bk and 84bl receive a reflected light beam that forms the read main detected spot 801b there. However, reflected light beams that leave read sub-detected spots 802b, 803b, 804b and 805b are not received by any photosensitive element of the photodetector 9.

With such an arrangement adopted, while performing a write operation with good stability by generating a stabilized TE signal, which will never produce an offset due to lens shifting; for example, using the write main detected spot and sub-detected spots, a read operation can also be performed using the read main detected spot. As a result, photosensitive elements to receive light beams that leave the read sub-detected spots can be omitted, and therefore, a downsized inexpensive optical pickup is realized.

Next, it will be described with reference to FIG. 11B what if the optical storage medium 7 has multiple information storage layers.

While data is being read from, or written on, a target one of the information storage layers of the optical storage medium 7, the condensed read and write light beam spots are on the target information storage layer. However, light may also be reflected from another information storage layer that the incoming light passes before reaching the target layer or even from still another information storage layer that the incoming light may enter after having been incident on that target layer. Those reflected light rays (i.e., stray light rays) are incident on, and reflected from, those information storage layers after having defocused. As a result, as shown in FIG. 11B, a stray light ray 800a involved with the write light beam spot and another stray light ray 800b involved with the read light beam spot are incident on the photodetector 9 after having defocused.

In this case, the stray light ray 800a involved with the write light beam spot has had its quantity changed due to modulation of the write light beam. That is why its modulation component is added to the information signal represented by Equation (5).

By using signals representing reflected light beams that have left the write sub-detected spots 802a, 803a, 804a and 805a that are not affected by any variation in reflectance while a write operation is being performed on the optical storage medium, the modulated signal can be obtained by $$MS = E + F + G + H \quad (6')$$

Consequently, in this case, the information signal obtained from the optical storage medium is calculated by $$RF' = I + J + K + L - \beta \times MS \text{ (where } \beta \text{ is a constant)} \quad (7)$$

Optionally, in order to cancel the variation in the intensity of light due to the modulation of the light, the information signal may also be calculated by $$RF'' = (I + J + K + L)/MS \quad (8)$$

Furthermore, if the information signal is calculated by $$RF''' = (I + J + K + L - \beta MS)/MS \quad (9)$$

then the influence of the variation in the intensity of light due to the modulation of the light on the information signal can be reduced.

In general, the intensity of light of the write light beam spot is approximately ten times as high as that of the read light beam spot, and the intensity of the stray light is approximately one tenth of that of the reflected light that has left a light beam spot on the information storage layer. That is why the intensity of the stray light 800*b* involved with the read light beam spot is much lower than that of the reflected light that has left the write main or sub-detected spot. Consequently, there is only a little influence of the stray light 800*b* on the TE signal obtained based on the write main and sub-detected spots.

Likewise, as for the read light beam spot, there is also a light ray that is reflected from another information storage layer and incident on the photodetector 9 after having defocused. However, that stray light ray involved with the read light beam spot that has been reflected from another information storage layer will reach points that are too far away from the respective photosensitive elements 81*aa*, 82*ab*, 83*ac*, 84*ad*, 85*ae*, 86*af*, 87*ag*, 88*ah*, 81*bi*, 82*bj*, 83*bk* and 84*bl* to be incident on any of those photosensitive elements. For that reason, there is no need to consider that stray light ray involved with the read light beam spot.

Figure 10C:
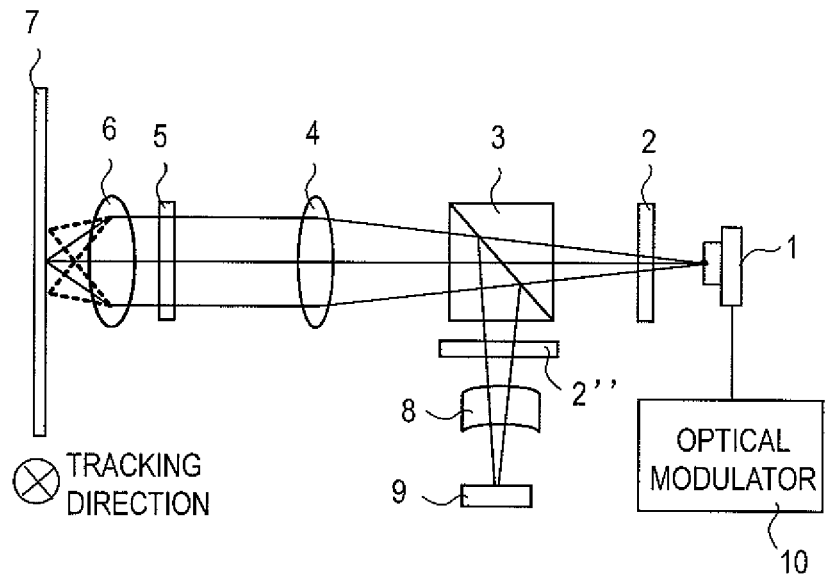
FIG. 10C illustrates an alternative arrangement for the optical pickup of the third embodiment.

Optionally, to eliminate the influence of the stray light, an opaque region may be provided for a portion of the optical system that the stray light passes on its way back from the optical storage medium. FIG. 10C illustrates an example of the diffractive element 2" with such an opaque region. In FIG. 10C, illustrated are the range 40*a* through which the light reflected from the information storage layer on which a write operation is being performed passes, the range 40*b* through which the light reflected from the information storage layer on which a read operation is being performed passes, and the opaque region 709 which does not transmit the incoming light. In this case, the opaque region 709 is defined to be approximately as large as a part 810*a* of the stray light involved with the write light beam spot, which has been incident on the photodetector 9, when that part 810*a* is projected onto the diffractive element 2" in FIG. 11C.

That is why of the stray light 800*a* involved with the write light beam spot, its parts that would be incident on the photosensitive elements 81*bi*, 82*bj*, 83*bk* and 84*bl* to receive the light that forms the read main detected spot on the photodetector 9 can be removed almost entirely and the reflected light that has left the read main light beam spot can be detected without being affected by the stray light. As a result, an information signal of good quality can be obtained.

By adopting such a configuration, even if the optical storage medium has multiple information storage layers, the influence of the stray light that has come from a different information storage layer from the target of the read/write operation can be eliminated or reduced significantly to say the least. As a result, not only a write operation but also reading an information signal can be performed with good stability.

In the embodiment described above, the laser light source 1 is supposed to have a plurality of emission points. However, even if an arrangement in which the laser light source 1 has only one emission point and in which a light beam that has been emitted from the laser light source 1 is split into a write light beam and a read light beam by a diffractive element 2 is adopted as shown in FIG. 10D, the detector arrangement of this embodiment can also be used effectively.

Figure 10D:
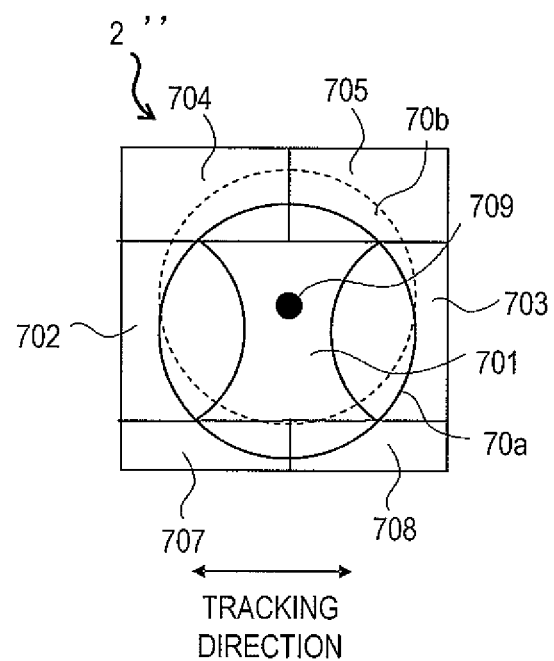
FIG. 10D illustrates a configuration for the optical pickup of the third embodiment.

In FIG. 10D, the diffractive element 2 functioning as an optical branching element splits the light beam that has been emitted from the laser light source 1 into a zero-order light beam to be a write beam and ±first-order light beams to be read beams. In that case, the condensed light beam spots formed by the objective lens 6 on the optical storage medium 7 are a write light beam spot 201*a* and read light beam spots 201*b* and 201*c* as shown in FIG. 8B.

In this case, the light that has left the write light beam spot 201*a* and then been reflected from the optical storage medium 7 gets diffracted by the diffractive element 2", thereby leaving a write main detected spot 801*a*, write sub-detected spots 802*a*, 803*a*, 804*a* and 805*a* and a read detected spot 801*b*. Thus, by adopting the configuration described above, this embodiment can also be applied.

It should be noted that the reflected light that has left the read light beam spot 201*c* is not received by any photosensitive element on the photodetector 9.

Consequently, even if the laser light source has only one emission point, while performing a write operation with good stability by generating a stabilized TE signal, which will never produce an offset due to lens shifting, for example, using the write light beam spot, a downsized inexpensive optical pickup is realized. In addition, even if the optical storage medium has multiple information storage layers, the influence of the stray light that has come from a different information storage layer from the target of the read/write operation can be reduced significantly. As a result, not only a write operation but also reading an information signal can be performed with good stability as well.

Embodiment 4

Hereinafter, an optical pickup as a fourth embodiment of the present disclosure will be described with reference to FIGS. 12A through 12C.

In the following description, any component having substantially the same function as its counterpart that has already been described for the related art or the first, second or third embodiment is identified by the same reference numeral.

Figure 12A:
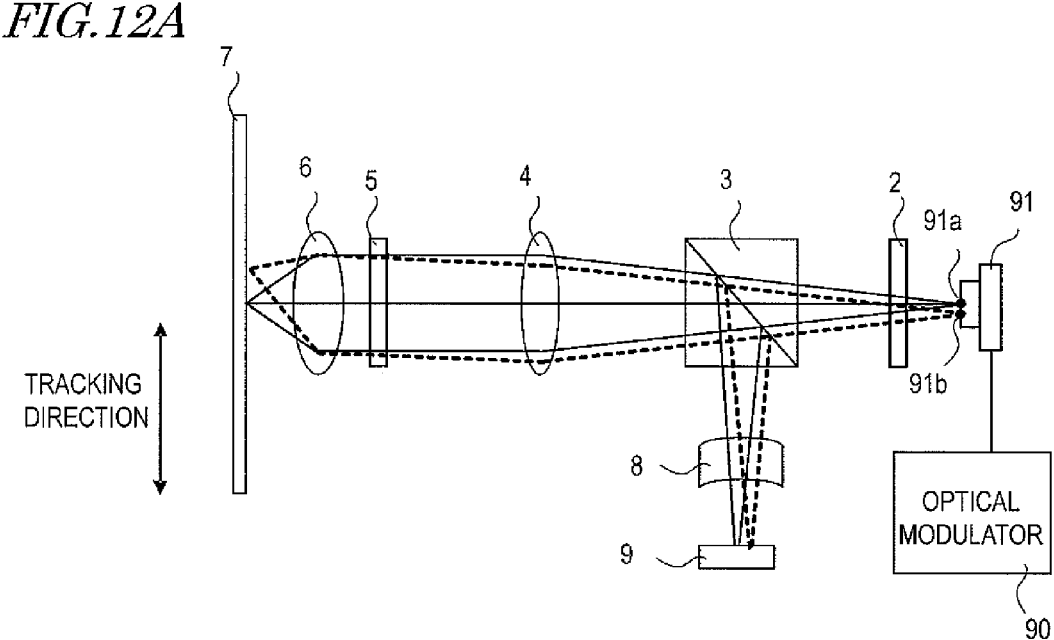
FIG. 12A illustrates an arrangement for an optical pickup according to a fourth embodiment of the present disclosure.

FIG. 12A illustrates the arrangement of an optical system for an optical pickup according to this embodiment.

An optical pickup according to this embodiment includes a laser light source 91 with first and second emission points 91*a* and 91*b*, an optical modulator 90 which forms a recorded mark on the optical storage medium 7, a diffractive element 2 which diffracts the light that has come from the laser light source 91 and which branches it into a zero-order light beam and ±first-order light beams, an objective lens 6 which condenses the diffracted light onto the optical storage medium 7, and a photodetector 9 which receives the light that has been reflected from the optical storage medium 7. The optical modulator 90 makes optical modulation on each of the light beams that have been emitted from the first and second emission points 91*a* and 91*b*. Thus, this optical pickup can form two different recorded marks simultaneously using two light beam spots formed by the light beams that have come from the first and second emission points 91*a* and 91*b*.

In the example illustrated in FIG. 12A, each of the light beams that have been emitted from the emission points 91*a* and 91*b* is diffracted and branched by the diffractive element 2 into a zero-order light beam and ±first-order light beams. These branched light beams pass through the polarization beam splitter 3 and are transformed into parallel light beams by the collimator lens 4. After that, those parallel light beams are transmitted through the wave plate 5 to turn into circularly polarized light beams and then condensed by the objective lens 6, thereby leaving respective light beam spots on the information storage layer of the optical storage medium 7. On the way back, the light that has been reflected from the optical storage medium 7 is transmitted through the objective lens 6 and the wave plate 5 to be transformed into plane polarized light, of which the polarization direction is perpendicular to the one on the way toward the optical storage medium. As a result, the reflected light is transmitted through the collimator lens 4 and reflected from the polarization beam splitter 3. After that, the reflected light is given astigmatism by the condenser-lens 8 and then incident on the photodiodes on the photodetector 9. In FIG. 12A, the tracking direction of the optical storage medium 7 is supposed to be parallel to the paper.

Figure 12B:
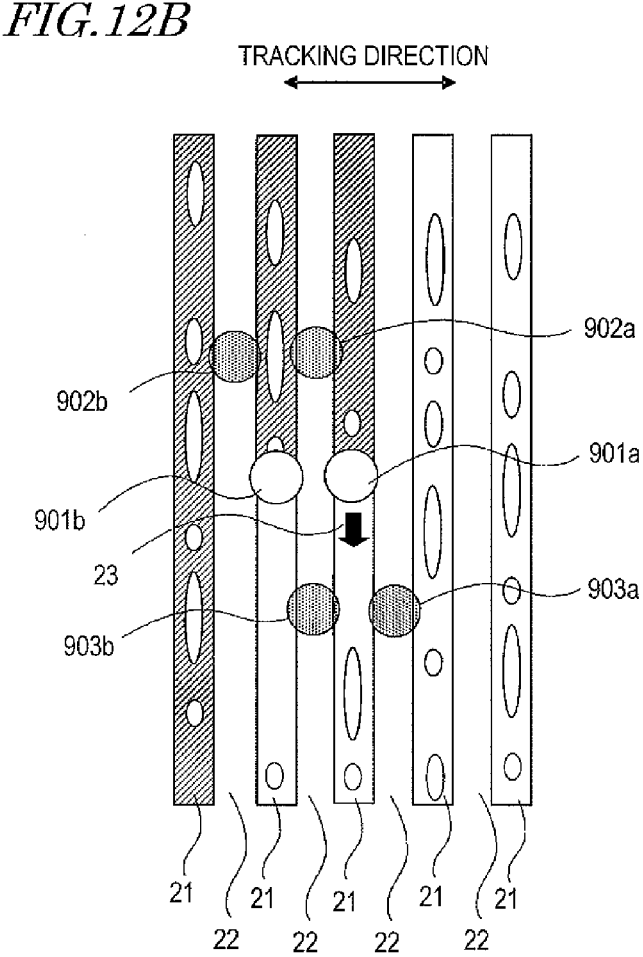
FIG. 12B illustrates how spots are left on an optical storage medium according to the fourth embodiment.

FIG. 12B illustrates an exemplary arrangement of six light beam spots that have been formed on the information storage layer of the optical storage medium 7 by condensing those light beams on it.

In the example illustrated in FIG. 12B, the information storage layer of the optical storage medium 7 has unevenness. The optical storage medium 7 appears to be scanned in the direction indicated by the arrow 23 along recording tracks 21 on which marks are going to be recorded (i.e., land portions or raised portions of the unevenness). Actually, however, those light beam spots are fixed and the optical storage medium 7 moves in the opposite direction to the one indicated by the arrow 23.

A first main light beam spot 901a is left on a track (land) 21 by the zero-order light beam that has been emitted from the first emission point 91a and then transmitted through the diffractive element 2 shown in FIG. 12A. On the other hand, the ±first-order light beams that have been emitted from the first emission point 91a and then diffracted by the diffractive element 2 shown in FIG. 12B are condensed between tracks (i.e., onto grooves 22), thereby forming a first pair of sub-light beam spots 902a and 903a there. Furthermore, the zero-order light beam that has been emitted from the second emission point 91b and then transmitted through the diffractive element 2 is condensed onto another track (land) 21 that is adjacent to the track on which the first main light beam spot is formed, thereby leaving a second main light beam spot 901b there. And the ±first-order light beams that have been emitted from the second emission point 91b and then diffracted by the diffractive element 2 are also condensed between tracks (i.e., onto grooves 22), thereby forming a second pair of sub-light beam spots 902b and 903b there.

In FIG. 12B, marks have already been left on the recording tracks on which marks are going to be recorded. That is to say, FIG. 12B illustrates how marks are overwritten on the existent recorded marks.

FIG. 12C illustrates an exemplary arrangement of photosensitive elements in the photodetector 9.

In FIG. 12B, the light beams that have left the light beam spots 901a, 901b, 902a, 902b, 903a and 903b on the optical storage medium 7 as shown in FIG. 12A are reflected from the information storage layer of the optical storage medium 7 to be incident on the photodetector 9 and form detected spots 1001a, 1001b, 1002a, 1002b, 1003a and 1003b there.

As shown in FIG. 12C, the photodetector 9 includes twelve photosensitive elements, namely, photosensitive elements 41aa, 42ab, 43ac and 44ad, photosensitive elements 45ae and 46af, photosensitive elements 47ag and 48ah, and photosensitive elements 41bi, 42bj, 43bk and 44bl. The photosensitive elements 41aa, 42ab, 43ac and 44ad receive the light beam that has left the first main light beam spot 901a on the optical storage medium 7 and has just formed the detected spot 1001a here. The photosensitive elements 45ae, 46af, 47ag and 48ah respectively receive the light beams that have left the first pair of sub-light beam spots 902a and 903a on the optical storage medium 7 and have just formed the detected spots 1002a and 1003a here. In this embodiment, the respective divided photosensitive elements 41aa, 42ab, 43ac, 44ad, 45ae, 46af, 47ag, 48ah, 41bi, 42bj, 44bk and 44bl output signals A, B, C, D, E, F, G, H, I, J, K and L, respectively.

By performing arithmetic processing on these signals A through L, a tracking error signal TE, a focus error signal FE and a read signal RF can be generated based on Equations (1) through (5) as in the first embodiment described above.

With such an arrangement adopted, while performing a write operation with good stability by generating a stabilized TE signal, which will never produce an offset due to lens shifting, for example, using the first main detected spot and sub-detected spots, a write operation can also be performed on another track using the second main detected spot. As a result, photosensitive elements to receive light beams that leave the second pair of sub-detected spots can be omitted, and therefore, a write operation can get done in a shorter time and the optical pickup can have an increased transfer rate during writing by using a downsized inexpensive optical pickup.

Also, even if the optical storage medium 7 has a plurality of information storage layers, an arrangement for eliminating or significantly reducing the influence of stray light as already described for the first embodiment can be easily realized and the effect of the embodiment described above can also be achieved.

Optionally, by using the light beams that have been emitted from the first and second emission points 91a and 91b of the laser light source 91, information signals can be read from two different tracks simultaneously, and the optical pickup can have an increased transfer rate during reading.

Figure 13:
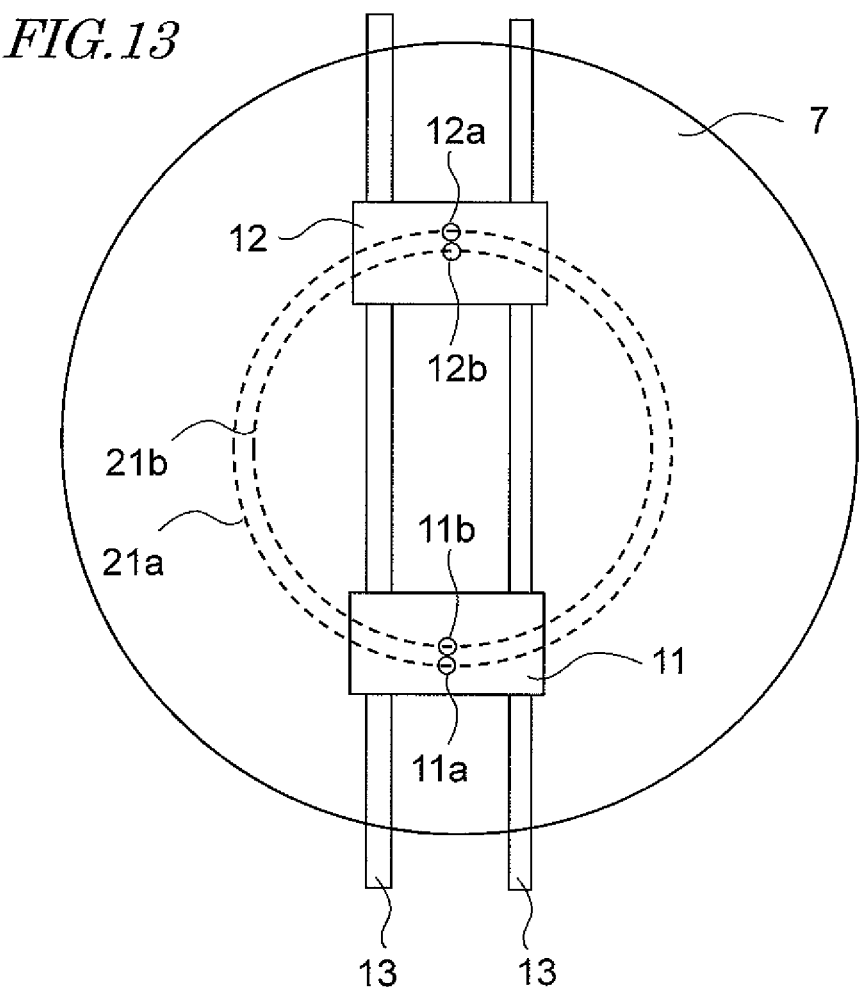
FIG. 13 illustrates a configuration for an optical read/write apparatus for use in the fourth, fifth and sixth embodiments of the present disclosure.

FIG. 13 illustrates an optical read/write apparatus including an optical pickup which writes data on multiple tracks in parallel using multiple light beam spots and another optical pickup which reads data from multiple tracks in parallel using light beam spots.

The optical read/write apparatus shown in FIG. 13 includes an optical pickup 11 that performs write operations on two different tracks in parallel by using the two light beam spots that have already been described with reference to FIG. 12A and another optical pickup 12 that performs read operations on two different tracks in parallel by using the two light beam spots that have also been described with reference to FIG. 12A. This apparatus further includes a guide shaft 13 that moves these two optical pickups 11 and 12 in the radial direction of the optical storage medium 7.

First and second light beam spots 11a and 11b are formed by the optical pickup 11 for writing on the optical storage medium 7. In addition, first and second light beam spots 12a and 12b are formed by the optical pickup 12 for reading on the optical storage medium 7. The light beam spots 11a and 12a are located on the same track, so are the light beam spots 11b and 12b.

By controlling these two optical pickups using an optical pickup controller (not shown), the optical read/write apparatus of this embodiment performs a read operation using the first light beam spot 12a formed by the optical pickup for reading 12 right after having performed a write operation using the first light beam spot 11a formed by the optical pickup for writing 11, and performs a read operation using the second light beam spot 12b formed by the optical pickup for reading 12 right after having performed a write operation using the second light beam spot 11b formed by the optical pickup for writing 11.

With such a configuration adopted, a verify operation can be carried out while performing write operations on multiple tracks and reading signals that have just been written in parallel using multiple spots, thereby realizing an optical read/ write apparatus that can have a high read/write transfer rate while achieving high reliability in writing.

Embodiment 5

Hereinafter, an optical pickup as a fifth embodiment of the present disclosure will be described with reference to FIGS. 14A and 14B.

In the following description, any component having substantially the same function as its counterpart that has already been described for the related art or the first, second, third or fourth embodiment is identified by the same reference numeral.

Figure 14A:
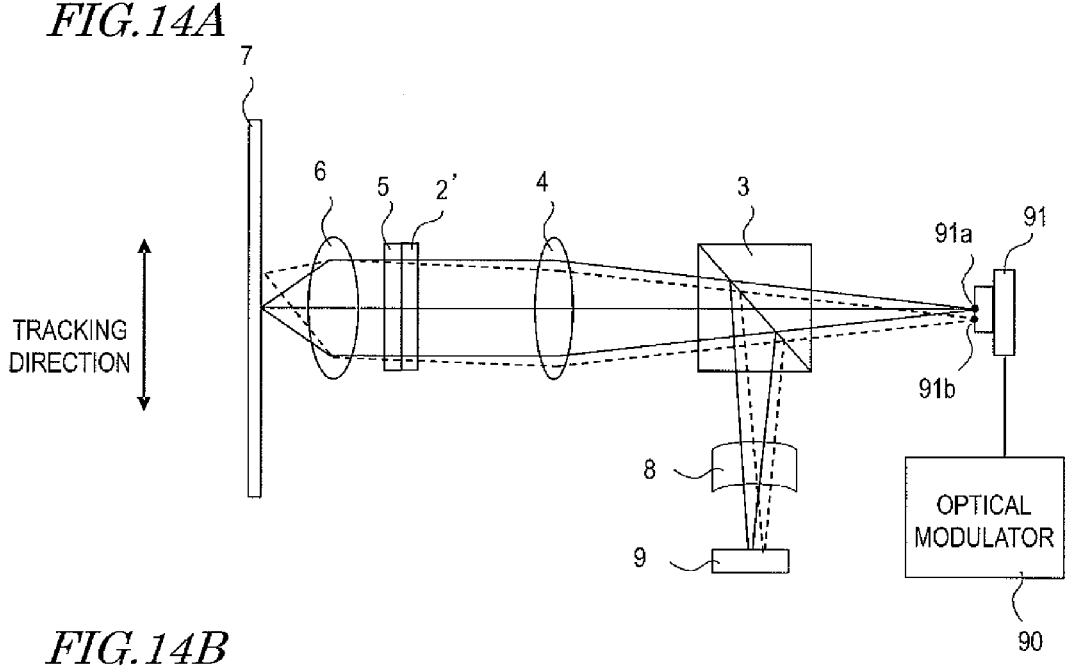
FIG. 14A illustrates an arrangement for an optical pickup according to a fifth embodiment of the present disclosure.

As shown in FIG. 14A, an optical pickup according to this embodiment includes a laser light source 91 with first and second emission points 91a and 91b, an optical modulator 90 which forms a recorded mark on the optical storage medium 7, an objective lens 6 which condenses the diffracted light onto the information storage layer of the optical storage medium 7, a polarizing diffractive element 2' which diffracts the light that has been reflected from the optical storage medium 7 and which branches it into a zero-order light beam and ±first-order light beams, and a photodetector 9 which receives those light beams. The optical modulator 90 makes optical modulation on each of the light beams that have been emitted from the first and second emission points 91a and 91b. Thus, this optical pickup can form two different recorded marks simultaneously using two light beam spots formed by the light beams that have come from the first and second emission points 91a and 91b.

In the example illustrated in FIG. 14A, each of the light beams that have been emitted from the first and second emission points 91a and 91b is passed through the polarization beam splitter 3 and transformed into parallel light beams by the collimator lens 4. After that, those parallel light beams are transmitted through the polarizing diffractive element 2', which has the property of totally transmitting the light emitted from the first and second emission points 91a, 91b in its polarization direction, and then passed through the wave plate 5 to turn into circularly polarized light beams and then condensed by the objective lens 6, thereby leaving respective light beam spots on the information storage layer of the optical storage medium 7. On the way back, the light that has been reflected from the optical storage medium 7 is transmitted through the objective lens 6 and the wave plate 5 to be transformed into plane polarized light, of which the polarization direction is perpendicular to the one on the way toward the optical storage medium. After that, the light gets diffracted and branched into a zero-order light beam and first-order light beams by the polarizing diffractive element 2' that diffracts the light in that polarization direction.

As shown in FIG. 7B, the polarizing diffractive element 2' has two divided areas 401 and 402, which are defined by a line segment that is drawn perpendicularly to the tracking direction of the optical storage medium 7. The light, which selectively turns ON, according to its polarization direction, the diffraction function of the polarizing diffractive element 2', gets diffracted and branched into a zero-order light beam and ±first-order light beams by these areas 401 and 402.

The three light beams that have been branched by the polarizing diffractive element 2' are transmitted through the collimator lens 4, reflected from the polarization beam splitter 3, given astigmatism by the condenser lens 8, and then incident on the photosensitive elements of the photodetector 9.

In this case, the objective lens 6, along with the wave plate 5 and the polarizing diffractive element 2' that are combined together, performs a focus control and tracking control on the optical storage medium 7.

In FIG. 14A, the tracking direction of the optical storage medium 7 is supposed to be the direction coming out of the paper.

Figure 14B:
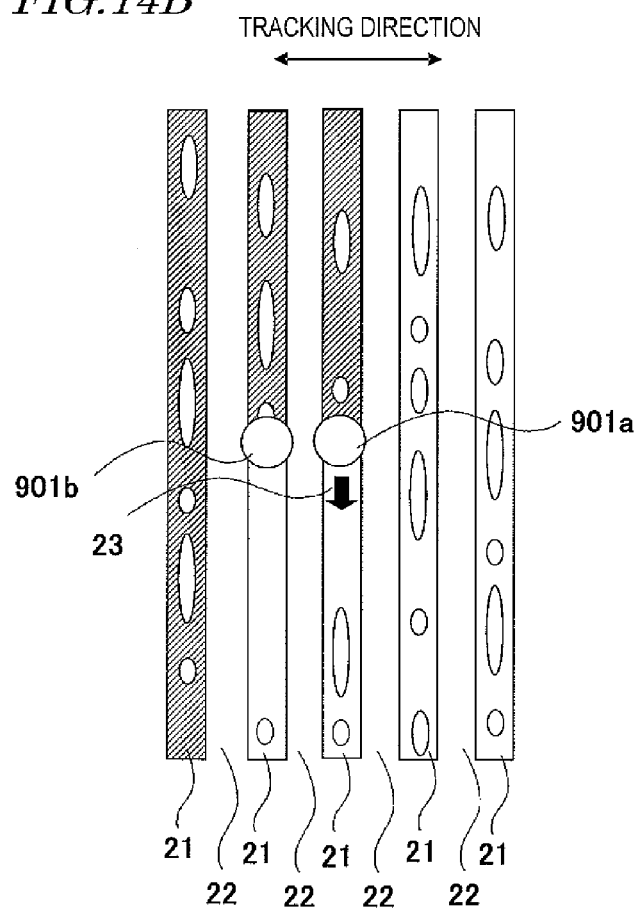
FIG. 14B illustrates how spots are left on an optical storage medium according to the fifth embodiment.

FIG. 14B illustrates an exemplary arrangement of light beam spots that have been formed on the information storage layer of the optical storage medium 7 by condensing those light beams on it.

In the example illustrated in FIG. 14B, the information storage layer of the optical storage medium 7 has unevenness. The light beam spots appear to move in the direction indicated by the arrow 23 along recording tracks 21 on which marks are going to be recorded (i.e., land portions or raised portions of the unevenness). Actually, however, those light beam spots are fixed and the optical storage medium 7 moves in the opposite direction to the one indicated by the arrow 23. The first light beam spot 901a is left by the light beam that has been emitted from the first emission point 91a, while the second light beam spot 901b is left by the light beam that has been emitted from the second emission point 91b.

FIG. 14C illustrates an exemplary arrangement of photosensitive elements in the photodetector 9.

In the example illustrated in FIG. 14C, of the reflected light that has left the first light beam spot 901a shown in FIG. 14B, the zero-order light beam that has been split by the polarizing diffractive element 2' is incident on the photodetector 9 and forms a first main detected spot 1101a there. Meanwhile, the ±first-order light beams that have been produced by the area 401 are incident on the photodetector 9 and form a first pair of sub-detected spots 1103a and 1104a there. And the ±first-order light beams that have been produced by the area 402 are incident on the photodetector 9 and form another first pair of sub-detected spots 1102a and 1105a there.

On the other hand, of the reflected light that has left the second light beam spot 901b, the zero-order light beam that has been split by the polarizing diffractive element 2' is incident on the photodetector 9 and forms a second main detected spot 1101b there. Meanwhile, the ±first-order light beams that have been produced by the area 401 are incident on the photodetector 9 and form a second pair of sub-detected spots 1103b and 1104b there. And the ±first-order light beams that have been produced by the area 402 are incident on the photodetector 9 and form another second pair of sub-detected spots 1102b and 1105b there.

In the example illustrated in FIG. 14C, the photodetector 9 includes ten photosensitive elements 51aa, 52ab, 53ac, 54ad, 55ae, 56af, 51bi, 52bj, 53bk and 54bl. The photosensitive elements 51aa, 52ab, 53ac and 54ad receive a light beam that has left the first main detected spot 901a. The photosensitive elements 55ae and 56af receive light beams that have left the first pair of sub-detected spots 1102a and 1103a, respectively. These divided photosensitive elements 51aa, 52ab, 53ac, 54ad, 55ae, 56af, 51bi, 52bj, 53bk and 54bl output signals A, B, C, D, E, F, I, J, K and L, respectively.

By performing arithmetic processing on these signals A through L, a tracking error signal TE, a focus error signal FE and a read signal RF can be generated.

With such an arrangement adopted, while performing a write operation with good stability by generating a stabilized TE signal, which will never produce an offset due to lens shifting, for example, using the first main detected spot and sub-detected spots, a write operation can also be performed on another track using the second main detected spot. As a result, photosensitive elements to receive light beams that leave the second pair of sub-detected spots can be omitted, and therefore, a write operation can get done in a shorter time and the optical pickup can have an increased transfer rate during writing by using a downsized inexpensive optical pickup.

Also, even if the optical storage medium 7 has a plurality of information storage layers, an arrangement for eliminating or significantly reducing the influence of stray light as already described for the first embodiment is easily realized and the effect of the embodiment described above can also be achieved.

Optionally, by using the light beams that have been emitted from the first and second emission points 91a and 91b of the laser light source 91, information signals can be read from two different tracks simultaneously, and the optical pickup can have an increased transfer rate during reading.

That is why this embodiment is also applicable to an optical read/write apparatus that includes an optical pickup for performing write operations on multiple tracks in parallel using multiple light beam spots and another optical pickup for performing read operations on multiple tracks simultaneously using multiple light beam spots as already described for the fourth embodiment with reference to FIG. 13. With such a configuration adopted, a verify operation can be carried out while performing write operations on multiple tracks and reading signals that have just been written in parallel using multiple spots, thereby realizing an optical read/write apparatus that can have a high read/write transfer rate while achieving high reliability in writing.

Embodiment 6

Hereinafter, an optical pickup as a sixth embodiment of the present disclosure will be described with reference to FIGS. 15A through 15C. In the following description, any component having substantially the same function as its counterpart that has already been described for the related art or the first, second, third, fourth, or fifth embodiment is identified by the same reference numeral.

Figure 15A:
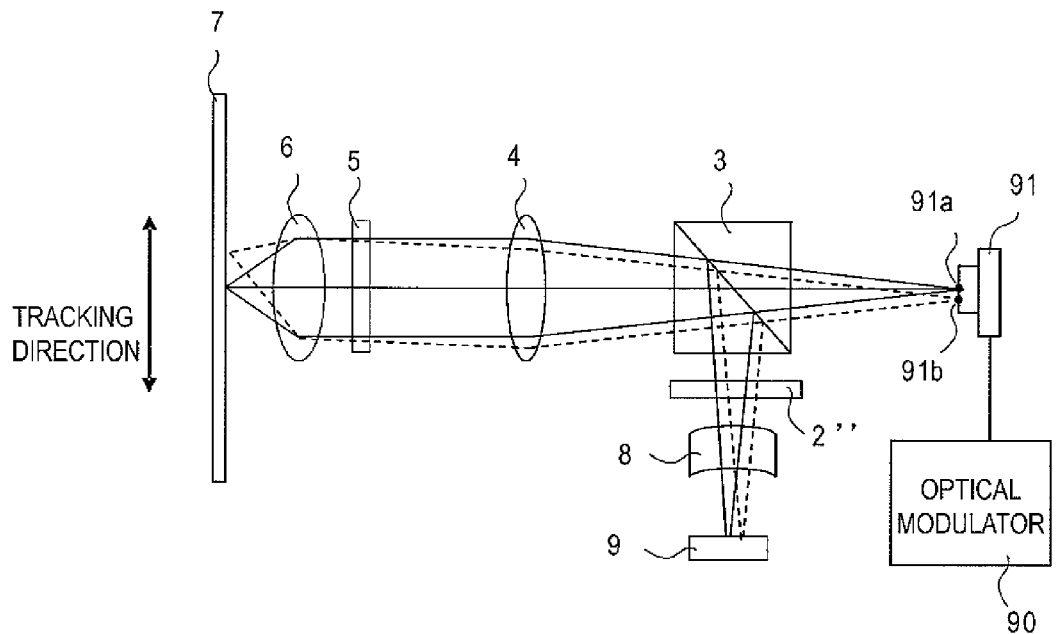
FIG. 15A illustrates an arrangement for an optical pickup according to a sixth embodiment of the present disclosure.

As shown in FIG. 15A, an optical pickup according to this embodiment includes a laser light source 91 with first and second emission points 91a and 91b, an optical modulator 90 which forms a recorded mark on the optical storage medium 7, a lens 6 which condenses diffracted light onto the information storage layer of the optical storage medium 7, a diffractive element 2" which diffracts the light that has been reflected from the optical storage medium 7 and which branches it into a zero-order light beam and ±first-order light beams, and a photodetector 9 which receives those light beams. The optical modulator 90 makes optical modulation on each of the light beams that have been emitted from the first and second emission points 91a and 91b. Thus, this optical pickup can form two different recorded marks simultaneously using two light beam spots formed by the light beams that have come from the first and second emission points 91a and 91b.

In the example illustrated in FIG. 15A, each of the light beams that have been emitted from the first and second emission points 91a and 91b is passed through the polarization beam splitter 3 and transformed into parallel light beams by the collimator lens 4. After that, those parallel light beams are passed through the wave plate 5 to turn into circularly polarized light beams and then condensed by the objective lens 6, thereby leaving respective light beam spots on the information storage layer of the optical storage medium 7. On the way back, the light that has been reflected from the optical storage medium 7 is transmitted through the objective lens 6 and the wave plate 5 to be transformed into plane polarized light, of which the polarization direction is perpendicular to the one on the way toward the optical storage medium. Next, the reflected light is transmitted through the collimator lens 4, reflected from the polarization beam splitter 3, and then branched into a zero-order light beam and ±first-order light beams by the diffractive element 2". Thereafter, those light beams are given astigmatism by the condenser lens 8 and then incident on the photosensitive elements of the photodetector 9.

As shown in FIG. 10B, the diffractive element 2" has seven divided areas 701 through 708, in which the incoming light is split into a zero-order light beam to leave a main spot and ±first-order light beams to leave sub-spots. In FIG. 10B, illustrated are the area 70a through which the reflected light that has left the write light beam spot passes and the area 70b through which the reflected light that has left the second light beam spot passes.

Figure 15B:
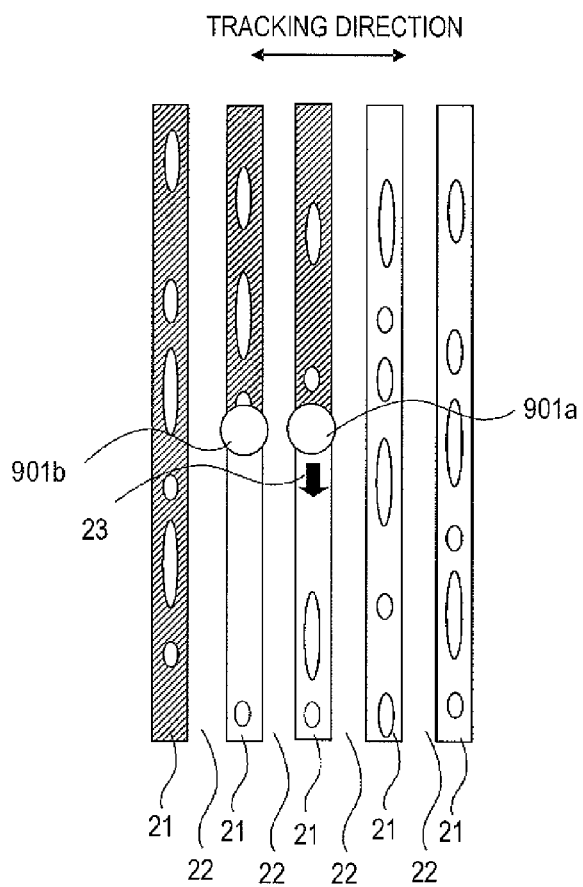
FIG. 15B illustrates how spots are left on an optical storage medium according to the sixth embodiment.

The light beam spots that have been formed on the information storage layer of the optical storage medium 7 by condensing those reflected light beams on it may be arranged as shown in FIG. 15B.

In the example illustrated in FIG. 15B, the information storage layer of the optical storage medium 7 has unevenness. The optical storage medium 7 appear to be scanned in the direction indicated by the arrow 23 along recording tracks 21 on which marks are going to be recorded (i.e., land portions or raised portions of the unevenness). Actually, however, those light beam spots are fixed and the optical storage medium 7 moves in the opposite direction to the one indicated by the arrow 23.

The first light beam spot 901a is left by the light beam that has been emitted from the first emission point 91a, while the second light beam spot 901b is left by the light beam that has been emitted from the second emission point 91b. In FIG. 15A, the tracking direction of the optical storage medium 7 is supposed to be parallel to the paper.

FIG. 15C illustrates an exemplary arrangement of photosensitive elements in the photodetector 9.

In the example illustrated in FIG. 15C, of the reflected light that has left the first light beam spot 901a shown in FIG. 15B, the zero-order light beam that has been split by the diffractive element 2" is incident on the photodetector 9 and forms a first main detected spot 1201a there. Meanwhile, the +first-order light beam that has been produced by the area 702 is incident on the photodetector 9 and forms a first sub-detected spot 1202a there. The +first-order light beam that has been produced by the area 703 is incident on the photodetector 9 and forms another first sub-detected spot 1203a there. The +first-order light beam that has been produced by the areas 704 and 707 is incident on the photodetector 9 and forms another first sub-detected spot 1204a there. And the +first-order light beam that has been produced by the areas 705 and 708 is incident on the photodetector 9 and forms another first sub-detected spot 1205a there.

On the other hand, of the reflected light that has left the second light beam spot 901b, the zero-order light beam that has been split by the diffractive element 2" is incident on the photodetector 9 and forms a second main detected spot 1201b there. Meanwhile, the +first-order light beam that has been produced by the area 702 is incident on the photodetector 9 and forms a second sub-detected spot 1202b there. The +first-order light beam that has been produced by the area 703 is incident on the photodetector 9 and forms another second sub-detected spot 1203b there. The +first-order light beam that has been produced by the areas 704 and 707 is incident on the photodetector 9 and forms another second sub-detected spot 1204b there. And the +first-order light beam that has been produced by the areas 705 and 708 is incident on the photodetector 9 and forms another second sub-detected spot 1205b there.

In the example illustrated in FIG. 15C, the photodetector 9 includes twelve photosensitive elements 71aa, 72ab, 73ac, 74ad, 75ae, 76af, 77ag, 78ah, 71bi, 72bj, 73bk and 74bl. The photosensitive elements 71aa, 72ab, 73ac and 74ad receive a light beam that has left the first main detected spot 1201a. The photosensitive elements 75ae, 76af, 77ag and 78ah receive light beams that have left the first sub-detected spots 1202a, 1203a, 1204a and 1205a, respectively. And the photosensitive elements 71bi, 72bj, 73bk and 74bl receive a light beam that has left the second main detected spot 1201b.

The ±first-order light beams produced by the area 701 of the diffractive element 2" and the −first-order light beam produced by the areas 702 through 708 will reach points that are too far away from the respective photosensitive elements 71aa, 72ab, 73ac, 74ad, 75ae, 76af, 77ag, 78ah, 71bi, 72bj, 73bk and 74bl on the photodetector 9 to be incident on any of those photosensitive elements. For that reason, those light beams are not illustrated in FIG. 15C.

In this case, these divided photosensitive elements 71aa, 72ab, 73ac, 74ad, 75ae, 76af, 71bi, 72bj, 73bk, and 74bl output signals A, B, C, D, E, F, I, J, K and L, respectively.

By performing arithmetic processing on these signals A through L, a tracking error signal TE, a focus error signal FE and a read signal RF can be generated as in the third embodiment described above.

With such an arrangement adopted, while performing a write operation with good stability by generating a stabilized TE signal, which will never produce an offset due to lens shifting, for example, using the first main detected spot and sub-detected spots, a write operation can also be performed on another track using the second main detected spot. As a result, photosensitive elements to receive light beams that leave the second pair of sub-detected spots can be omitted, and therefore, a write operation can get done in a shorter time and the optical pickup can have an increased transfer rate during writing by using a downsized inexpensive optical pickup.

Also, even if the optical storage medium 7 has a plurality of information storage layers, an arrangement for eliminating or significantly reducing the influence of stray light as already described for the first embodiment is easily realized and the effect of the embodiment described above can also be achieved.

Optionally, by using the light beams that have been emitted from the first and second emission points 91a and 91b of the laser light source 91, information signals can be read from two different tracks simultaneously, and the optical pickup can have an increased transfer rate during reading.

That is why this embodiment is also applicable to an optical read/write apparatus that includes an optical pickup for performing write operations on multiple tracks in parallel using multiple light beam spots and another optical pickup for performing read operations on multiple tracks simultaneously using multiple light beam spots as already described for the fourth embodiment with reference to FIG. 13. With such a configuration adopted, a verify operation can be carried out while performing write operations on multiple tracks and reading signals that have just been written in parallel using multiple spots, thereby realizing an optical read/write apparatus that can have a high read/write transfer rate while achieving high reliability in writing.

In the first through sixth embodiments described above, the optical storage medium is supposed to be an optical disc. However, this is just an example of the present disclosure. But those embodiments of the present disclosure are equally applicable to any other optical storage medium such as an optical tape and the same effect will also be achieved in that case.

Also, the configurations of the optical system and photodetector that have been described for the first through sixth embodiments are nothing but examples, too, and the present disclosure does not always have to be carried out that way.

According to an embodiment of the present disclosure, if the optical pickup is designed to include an optical branching element that produces sub-beams based on a first one of multiple light beam spots, a first type of photosensitive sections that receive a light beam that has left the first light beam spot and the sub-beams from the storage medium, and a second type of photosensitive section which is arranged between the first type of photosensitive sections to detect other light beam spots. Then, while performing a write operation with good stability by generating a stabilized TE signal, which will never produce an offset due to lens shifting, for example, a read operation can also be performed using the read main detected spot. As a result, photosensitive elements to receive light beams that leave the read sub-detected spots can be omitted, and therefore, a downsized inexpensive optical pickup is realized.

In addition, according to an embodiment of the present disclosure, an opaque member is arranged on the optical path of the second type of photosensitive section that receives not only a read light beam from a target one of multiple information storage layers of an optical storage medium, on which read and write operations are being performed in parallel, but also stray light from a non-target information storage layer as well. As a result, the influence of such stray light that has come from a different information storage layer from the one on which the read and write operations are performed can be eliminated or reduced significantly to say the least. As a result, not only the write operation but also reading an information signal can be carried out with good stability.

On top of that, by using two or more optical pickups each having the configuration described above and by making each of those optical pickups perform either only write operations or only read operations using multiple light beam spots, an optical pickup assembly that achieves high read/write transfer rates is realized.

If an optical pickup according to an embodiment of the present disclosure is used in a bulk data storage system that includes a number of such pickups (e.g., a data file system that uses an optical tape or an optical storage medium), data can be written accurately either on multiple different areas of a given optical storage medium or on multiple different optical storage media in parallel with each other. Thus, the present disclosure provides a cost-effective read/write apparatus with a simplified configuration.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-222493 filed on Oct. 7, 2011 and No. 2012-089795 filed on Apr. 11, 2012, the entire contents of which are hereby incorporated by reference.

What is claimed is:

1. An optical pickup comprising:
a light source with first and second emission points;
an optical branching element which branches light that has been emitted from the first emission point into multiple light beams including a first main beam and a first set of sub-beams and which also branches light that has been emitted from the second emission point into multiple light beams including a second main beam and a second set of sub-beams;
an optical system which condenses the multiple light beams that have been produced by the optical branching element onto an optical storage medium, thereby making the first and second main beams form a write light beam spot and a read light beam spot, respectively, on a target recording track on the optical storage medium and making the first and second sets of sub-beams form reference light beam spots and other light beam spots somewhere on the optical storage medium other than the target recording track; and
a photodetector,
wherein the photodetector includes
a plurality of photosensitive sections forming a first group which receive reflected light beams that have left the write light beam spot and the reference light beam spots, and
a photosensitive section forming a second group which receives reflected light that has left the read light beam spot,
wherein the photosensitive sections forming the first and second groups are arranged so as not to receive reflected light beams of the second set of sub-beams that have left the other light beam spots, and
wherein the photosensitive section forming the second group is arranged between the photosensitive sections forming the first group.

2. The optical pickup of claim 1, wherein some of the photosensitive sections forming the first group output signals to generate a tracking error signal by using reflected light beams that have left the reference light beam spots.

3. The optical pickup of claim 1, wherein the photosensitive sections forming the first and second groups are arranged in a tracking direction.

4. The optical pickup of claim 1, wherein some of the photosensitive sections forming the first group receive the first main beam and output the signals to generate a focus error signal.

5. An optical pickup comprising:
a light source with first and second emission points;
an optical branching element which branches light that has been emitted from the first emission point into multiple light beams including a first main beam and a first set of sub-beams and which also branches light that has been emitted from the second emission point into multiple light beams including a second main beam and a second set of sub-beams;
an optical system which condenses the multiple light beams that have been produced by the optical branching element onto an optical storage medium, thereby making the first and second main beams form a write light beam spot and a read light beam spot, respectively, on a target recording track on the optical storage medium and making the first and second sets of sub-beams form reference light beam spots and other light beam spots somewhere on the optical storage medium other than the target recording track; and
a photodetector,
wherein the photodetector includes
a plurality of photosensitive sections forming a first group which receive reflected light beams that have left the write light beam spot and the reference light beam spots, and
a photosensitive section forming a second group which receives reflected light that has left the read light beam spot,
wherein the photosensitive sections forming the first and second groups are arranged so as not to receive reflected light beams of the second set of sub-beams that have left the other light beam spots, and
wherein if the optical storage medium has multiple information storage layers that are stacked one upon the other, an opaque member is arranged on an optical path along which the first main beam that has been reflected from one of the information storage layers, other than a target one on which data is going to be written, would be incident on the photosensitive section forming the second group without the opaque member.

6. An optical pickup comprising:
a light source with first and second emission points;
an optical system which condenses light beams that have been emitted from the first and second emission points onto an optical storage medium, thereby forming a write light beam spot and a read light beam spot on a target recording track on the optical storage medium;
an optical branching element which branches reflected light that has left the write light beam spot into multiple light beams including a first main beam and a first set of sub-beams and which also branches reflected light that has left the read light beam spot into multiple light beams including a second main beam and a second set of sub-beams; and
a photodetector,
wherein the photodetector includes
a first group of photosensitive sections which receive the first main beam and the first set of sub-beams, and
a second group of photosensitive sections which receive the second main beam, and
wherein the photosensitive sections forming the first and second groups are arranged so as not to receive the second set of sub-beams.

7. The optical pickup of claim 6, wherein in the first group of photosensitive sections, the photosensitive sections that receive the first set of sub-beams are arranged substantially perpendicularly to a tracking direction on the optical storage medium with respect to the photosensitive section that receives the first main beam.

8. The optical pickup of claim 6, wherein in branching the reflected light that has left the write light beam spot into the first main beam and the first set of sub-beams, the optical branching element produces diffracted light beams in first and second areas out of respective portions of the reflected light that are located on one and the other sides of the tracking direction, and
wherein some of the photosensitive sections forming the first group receive the diffracted light beams in the first and second areas, thereby outputting the signals to generate a tracking error signal.

9. The optical pickup of claim 6, wherein in branching the reflected light that has left the write light beam spot into the first main beam and the first set of sub-beams, the optical branching element produces a diffracted light beam in a first area of the reflected light with a lot of information about diffraction produced by a track on the optical storage medium and a diffracted light beam in a second area of the reflected light other than the first area, and
   wherein some of the photosensitive sections forming the first group receive the diffracted light beams in the first and second areas, thereby outputting the signals to generate a tracking error signal.

10. The optical pickup of claim 6, wherein some of the photosensitive sections forming the first group receive the first main beam and output signals to generate a focus error signal.

11. The optical pickup of claim 6, wherein if the optical storage medium has multiple information storage layers that are stacked one upon the other, an opaque member is arranged on an optical path along which the first main beam that has been reflected from one of the information storage layers, other than a target one on which data is going to be written, would be incident on the photosensitive section forming the second group without the opaque member.

12. An optical pickup comprising:
   a light source;
   a first optical branching element which branches light that has been emitted from the light source into multiple light beams;
   an optical system which condenses the multiple light beams that have been produced by the first optical branching element onto an optical storage medium, thereby forming a write light beam spot and a read light beam spot on a target recording track on the optical storage medium;
   a second optical branching element which branches reflected light that has left the write light beam spot into multiple light beams including a first main beam and a first set of sub-beams and which also branches reflected light that has left the read light beam spot into multiple light beams including a second main beam and a second set of sub-beams; and
   a photodetector,
   wherein the photodetector includes:
   a first group of photosensitive sections which receive the first main beam and the first set of sub-beams; and
   a second group of photosensitive sections which receive the second main beam, and
   wherein the first and second groups of photosensitive sections are arranged so as not to receive the second set of sub-beams.

13. The optical pickup of claim 12, wherein in the first group of photosensitive sections, the photosensitive sections that receive the first set of sub-beams are arranged substantially perpendicularly to a tracking direction on the optical storage medium with respect to the photosensitive section that receives the first main beam.

14. The optical pickup of claim 12, wherein in branching the reflected light that has left the write light beam spot into the first main beam and the first set of sub-beams, the optical branching element produces diffracted light beams in first and second areas out of respective portions of the reflected light that are located on one and the other sides of the tracking direction, and
   wherein some of the photosensitive sections forming the first group receive the diffracted light beams in the first and second areas, thereby outputting the signals to generate a tracking error signal.

15. The optical pickup of claim 12, wherein in branching the reflected light that has left the write light beam spot into the first main beam and the first set of sub-beams, the optical branching element produces a diffracted light beam in a first area of the reflected light with a lot of information about diffraction produced by a track on the optical storage medium and a diffracted light beam in a second area of the reflected light other than the first area, and
   wherein some of the photosensitive sections forming the first group receive the diffracted light beams in the first and second areas, thereby outputting the signals to generate a tracking error signal.

16. The optical pickup of claim 12, wherein some of the photosensitive sections forming the first group receive the first main beam and output signals to generate a focus error signal.

17. The optical pickup of claim 12, wherein if the optical storage medium has multiple information storage layers that are stacked one upon the other, an opaque member is arranged on an optical path along which the first main beam that has been reflected from one of the information storage layers, other than a target one on which data is going to be written, would be incident on the photosensitive section forming the second group without the opaque member.

18. An optical read/write apparatus comprising:
   at least one optical pickup having the configuration of claim 1; and
   a control section that controls the optical pickup so that the optical pickup writes data using the write light beam spot and reads the data using the read light beam spots.

19. An optical read/write apparatus comprising:
   at least one optical pickup having the configuration of claim 6; and
   a control section that controls the optical pickup so that the optical pickup writes data using the write light beam spot and reads the data using the read light beam spots.

20. An optical read/write apparatus comprising:
   at least one optical pickup having the configuration of claim 12; and
   a control section that controls the optical pickup so that the optical pickup writes data using the write light beam spot and reads the data using the read light beam spots.

* * * * *